(12) United States Patent
Ouderkirk et al.

(10) Patent No.: US 6,181,474 B1
(45) Date of Patent: Jan. 30, 2001

(54) SCANNING CONFOCAL MICROSCOPE WITH OBJECTIVE LENS POSITION TRACKING

(75) Inventors: Steven J. Ouderkirk, West Richland, WA (US); Alan Blair, St. Paul, MN (US); Matthew C. Boettner, Woodbury, MN (US)

(73) Assignee: Kovex Corporation, Arden Hills, MN (US)

( * ) Notice: Under 35 U.S.C. 154(b), the term of this patent shall be extended for 0 days.

(21) Appl. No.: 09/274,057

(22) Filed: Mar. 22, 1999

(51) Int. Cl.[7] .................................................. B02B 27/14
(52) U.S. Cl. .................. 359/629; 250/251.1 A; 356/399; 356/400
(58) Field of Search .................. 250/252.1 A; 356/399, 356/400, 401; 359/629

(56) References Cited

U.S. PATENT DOCUMENTS

| 4,682,894 | 7/1987 | Schmidt et al. ...................... 356/375 |
| 4,704,020 | * 11/1987 | Murakami ............................ 353/122 |
| 4,863,252 | 9/1989 | McCarthy et al. .................... 350/507 |
| 4,899,041 | 2/1990 | Fetzer et al. ......................... 250/222.1 |
| 4,925,308 | 5/1990 | Stern et al. .......................... 356/375 |
| 5,120,953 | 6/1992 | Harris .................................. 250/227.2 |
| 5,161,053 | 11/1992 | Dabbs .................................. 359/384 |
| 5,179,276 | 1/1993 | Hakamata ............................ 250/234 |
| 5,245,177 | 9/1993 | Schiller ................................ 250/221 |
| 5,283,630 | 2/1994 | Yoshizumi ........................... 356/376 |
| 5,323,009 | 6/1994 | Harris .................................. 250/458.1 |
| 5,367,458 | * 11/1994 | Roberts ............................... 364/424.02 |
| 5,450,203 | 9/1995 | Penkethman ........................ 356/373 |
| 5,538,818 | * 7/1996 | Kamon ................................ 430/5 |
| 5,557,410 | 9/1996 | Huber et al. ........................ 356/376 |
| 5,557,452 | 9/1996 | Harris .................................. 259/368 |
| 5,583,704 | * 12/1996 | Fujii .................................... 359/884 |
| 5,585,925 | * 12/1996 | Sato et al. ........................... 356/401 |
| 5,753,931 | 5/1998 | Borchers et al. ................... 250/559.22 |
| 5,880,465 | 3/1999 | Boettner et al. .................... 250/234 |
| 5,952,723 | * 9/1999 | Takeyasu et al. ................... 257/771 |
| 5,981,119 | * 11/1999 | Adams ................................ 430/30 |

FOREIGN PATENT DOCUMENTS 1203297    7/1979   (IT) .

OTHER PUBLICATIONS

*Handbook of Biological Confocal Microscopy, Second Edition,* Chapters 9, 10 & 29, 139–165, 459–478, (1995).
Gu, M., et al., "Signal Level of the Fibre–Optical Confocal Scanning Microscope", *Journal of Modern Optics 38 (8),* pp. 1621–1630, (1991).
Kimura, S., et al., "Confocal Scanning Optical Microscope Using Single–Mode Fiber for Signal Detection", *Applied Optics 30 (16),* pp. 2143–2150, (Jun. 1, 1991).

* cited by examiner

*Primary Examiner*—Georgia Epps
*Assistant Examiner*—Tim Thompson
(74) *Attorney, Agent, or Firm*—Schwegman, Lundberg, Woessner & Kluth, P.A.

(57) ABSTRACT

A calibration device which has at least two targets. Each target has at least one surface exhibiting areas of optical contrast, and each surface has a general plane of orientation. The targets are oriented such that a general plane of orientation of one target is inclined at an angle relative to the general plane of orientation of a surface of the second target which has areas of optical contrast.

21 Claims, 16 Drawing Sheets

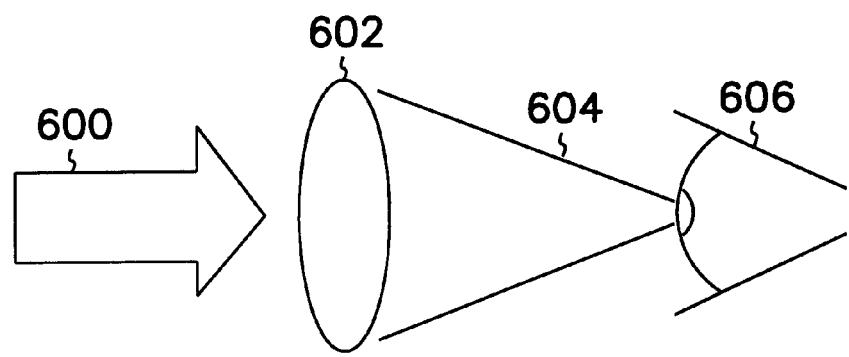
FIG. 20
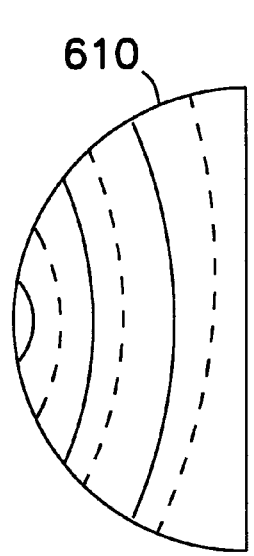 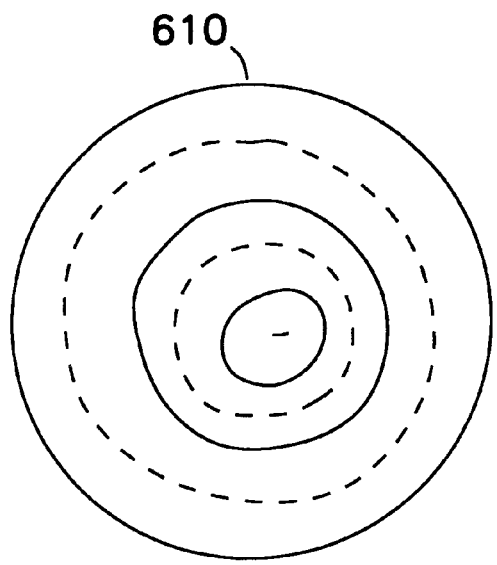
FIG. 21A    FIG. 21B

SCANNING CONFOCAL MICROSCOPE WITH OBJECTIVE LENS POSITION TRACKING

BACKGROUND OF THE ART

1. Field of the Invention

This invention relates to confocal microscopes which detect light reflected or emitted from a sample. This invention also relates to scanning confocal microscopes which provide high quality images at relatively low cost, and which can scan samples in at least one axis using a moving objective lens. This invention also relates to confocal microscopy for the examination or inspection of surfaces with features that are desired to be within a predetermined height range. These type of surfaces include but are not limited to solder paste, ball grid arrays, and flip chip pads. Confocal microscopy eliminates light reflected or emitted from a sample from all but a thin depth of focus around the microscope focal point. This allows the confocal microscope to accurately determine the height of a given feature on a surface. This invention also relates to calibration of 3D optical metrology devices, including confocal microscopes.

2. Background of the Invention

Confocal microscopes have been known at least in the literature since the 1950's. These microscopes use a visible originating radiation source (although some configurations may now use infrared [IR] or ultraviolet [UV] radiation) which is directed to a beam splitter. The beam splitter directs a portion of the radiation from the source to a collimating lens, which further directs the radiation towards an objective lens. The radiation passing through and focused by the objective lens converges on a focal point. When there is an object at or about the focal point, the focused radiation is reflected back through the objective lens and the collimation lens towards the beam splitter. A further reduced portion of the reflected radiation which has passed a second time through the objective lens and collimating lens passes through the beam splitter and is detected by a detector such as a semiconductor, photovoltaic sensor or large area detector. The radiation emitting source for the originating radiation may be any source which is capable of producing collimated radiation or which may be sufficiently collimated by the collimating lens to provide sufficient coherency to provide resolution to the image, consistency to the quality of the reflection from an object at the focal point and transmission to the detecting devices after the second pass through the beam splitter. Although these devices are of high quality and effectiveness in the marketplace, they are relatively expensive and have significant limitations in their utility which the present inventors have determined is at least in part a result of the weight and size of internal components.

The objective lens in commercial confocal microscopes have traditionally consisted of the higher cost and higher quality quartz lenses, which have significant mass (tending to be at least 20 grams and as much as 50 grams for the lens itself). The lens is moved relative to the target at the focal point by either gross movement of the microscope (with a fixed focal length), movement of the object target (again with a fixed focal length), by movement of the objective lens (changing the focal length), or combinations of these procedures. In those situations where the objective lens is to be moved, the control over the movement, and more importantly the identification of the amount of the movement and its position within the microscope system, is effected by a closed loop system of voltage regulation to coils or piezoelectric devices attached to the objective lens. Changes in the voltage/current to the coils causes them to move in a predetermined direction to shift the position of the objective lens. There are two or more coils (or sets of coils) attached to the objective lens to control movement of the lens in two or more axial directions. The two most important directions are 1) parallel to the incoming radiation from the columnating lens and 2) at least one of the two axes perpendicular to the direction of the radiation from the columnating lens. Direction 2) tends to be fixed (i.e., it is essentially parallel to the surface being scanned and can not readily move within the plane of lines or directions perpendicular to the radiation moving through the columnating lens) and is a single fixed direction often defined as the scanning direction relative to the object or target. The position of the focal point and the objective lens is estimated by the current/voltage provided to the coils. This has been sufficient for the accuracy needed in the confocal microscopes, but is not stable in its realistic accuracy. The response of the coils changes with time, the accuracy of the voltage/current readings change with time, the initial position of the objective lens may shift from impact or vibration, and other physical changes in the system alter the performance and accuracy of the determination of the position of the objective lens and focal point. In many systems, this is not necessarily a problem, as where in profilometers it is the relative variations in the surface which are important and not necessarily the actual position on a surface which is the primary interest of the observer.

In simple terminology, confocal microscopes use a detection method that preferentially measures light that is emitted (e.g., by phosphorescence or fluorescence) or reflected near the focal point of a beam of light. This is typically done by detecting reflected light which is returned through the same objective lens that originally projects a light beam at a target or object and subsequently measuring a portion of the returned light which follows or retraces a portion of the beam path of the illumination source after it has passed through a beam splitter. Microscopic images can be created by scanning either the beam or the sample through two or three axes while measuring signal intensity. Confocal detection offers greatly improved vertical resolution and clarity compared to conventional microscopy. The limitations of confocal microscopy are that the image is acquired by physically moving the focal point over or through a sample, which is generally a slow and often an optically complex process when compared to conventional optical microscopy. Much of the complexity in a confocal microscope is in moving the focal point. Moving the focal point by scanning the light beam can be accomplished either by moving pinholes or by deflecting the beam before the objective lens. Confocal microscopes based on scanned pinholes or aperture are commercially available. These types of confocal microscopes are readily adapted to use much of the optics in a conventional optical microscope. An alternative approach that achieves the same result is to fix the pinhole and scan the beam, illuminating the object or target in an arc, pattern or line form within one plane or two dimensions. Both the scanned beam and the scanned pinhole approaches require expensive objective lenses to provide a wide field of view with near diffraction limited resolution. In many cases, these confocal microscopes also preferably use expensive polarization preserving objective lenses to provide high signal throughput.

Another approach for achieving a scanned focal point in a sample is to scan the object or target co-linearly with the beam of light while the beam and pinhole are fixed in at least one scan axis. The other axes of motion are provided by either moving the sample, or the optical assembly, or both. This type of approach is exemplified in U.S. Pat. Nos. 5,179,276 and 4,863,252. All degrees of motion can also be provided through either the optical assembly, the sample, or a combination of the two. The latter two approaches have limited utility due to the mechanics of rapidly and accurately moving the samples and optical assemblies to provide two or three dimensional images. Resonant scanning of the objective can be used in some devices, although resonant systems are usually at a fixed frequency and are limited in their ability to pan over large sample areas.

The above approaches to confocal microscopy are typified as being inherently bulky and complex.

Italian Patent No. 1203297, published on Feb. 16, 1989 describes a profilometer for measuring the profile of a surface using a confocal distribution of optical assemblies (e.g., radiation source 3, collecting lens 8, beam splitter 5, spatial filter 9, and photoconverter 6). The position detector 14 for determining the instantaneous position of the lens 4 merely indicates electrical signals sent to a piezoelectric device 25a and 25b to oscillate the lens 4. The signal may be indicated by a potentiometer 27 with an indicator needle 27a. There is no collimating lens before the beam splitter, the lens oscillates to create movement of the focal point, single direction variation of the lens is provided (FIG. 2, device 12 for moving lens 4 parallel to its optical axis.

Keyence Corporation of America, 50 Tice Blvd., Woodcliff Lake, N.J. 07675 markets a displacement metering device LT-8110 laser displacement meter noteworthy for its long working distance in the operation of its focal point. The device has a light emitter, beam splitter, objective lens and finishing optical unit (in that sequence in the operation of the microscope). Light reflected off the target passes back through the finishing optics and the objective lens, to be broken into two paths by the beam splitter. One path continues essentially linearly to a light detection unit (e.g., photodetector) and the other path is deflected to another sensing unit whose operation is not understood. The working distance for the focal point is between about 10 and 28 mm, which would be quite large for a confocal microscope. This large working distance appears to be possible because of a relatively large focal length for the objective lens as compared to the diameter of the objective lens. This means that the effective F-number of the system is large (e.g., about 2). Lens systems with large F-numbers have larger spot sizes (when focusing emitted radiation) and larger depths of field. Larger spot sizes tend to decrease the resolving power of the system, which is consistent with the Keyence device advertised as providing about a 2 micron diameter laser beam (effectively defining the resolution of the system as comparable to about 2 microns). The Keyence microscope also is shown in the literature to have the objective move in only a single axis (the axis parallel to the laser beam). It is possible that the lens is moved in an arc, but this is still single direction control, without the capability of independent movement along at least two axes. The finishing optical unit appears to enhance the large working distance in this microscope by adjusting the angle of the radiation after it has passed through the objective lens.

Three-dimensional optical metrology devices such as the confocal laser scanning microscope (CLSM) are capable of generating 3D images with high levels of detail. In order to use these devices for metrology, the accuracy, repeatability, and resolution must be known. The accuracy of the device may be improved through calibration.

Imaging a 2D reference standard with features that have a known geometry has been used to calibrate 2D images. This technique has been applied to the CLSM by translating the 2D standard along the optic axis to collect multiple 2D calibration sets at differing elevations to generate a 3D calibration set. When this method is used errors introduced by translation of the sample will be added to the errors encountered when scanning normally.

BRIEF DESCRIPTION OF THE INVENTION

The present invention provides improvements to confocal microscopes, especially the confocal microscope described in U.S. patent Ser. No. 08/656,668 where the microscope consists of an illumination source, beam splitter, an objective lens which may be scanned in two or more axes, a spatial filter (pinhole aperture), and a detector that receives light reflected or emitted from a sample. Good alignment of the spatial filter in three dimensions is of obvious importance in the scanning objective lens of a confocal microscope to assure that as the objective lens is translated in a direction perpendicular to the incident light, the light returned from the sample must enter the spatial filter at an angle to the optical axis. If the spatial filter is misaligned with the objective lens focal point, the rays of light focused at an angle to the optical axis will be cut-off while those on the optical axis will still be allowed to pass through. This effect will result in a systematic error when trying to reconstruct a surface or volume using this type of confocal microscope.

The present invention describes the use of a fiber optic assembly. This can greatly increase the ease of alignment of a scanning objective confocal microscope. This is because the methods and tools for aligning an optical fiber to an output lens are readily available on the commercial market as are prealigned fiber assemblies because of the prevalence of optical fibers in communication systems. The microscope of this invention comprises a light source, a fiber optic assembly which includes a fiber optic beam splitter, an objective lens which may be scanned in two or more axes, and a detector to receive the light reflected or emitted from a sample.

The present invention also describes a confocal microscope having a radiation source, beam splitter, converging lens, objective lens, and radiation detector capable of recognizing radiation which is reflected or emitted from an object at the focal point of the objective lens, the confocal microscope having means therein to controllably move the objective lens and the focal point of the objective lens through a surface area of at least 0.35 mm$^2$ or a volume of at least 0.25 mm$^3$. This area or volumetric scanning of the focal point is effected by having at least one or two means for moving the objective lens, a first means of said at least two means able to move the objective lens along a first axis, and a second means of said at least two means capable of moving the objective lens along a second axis which is not parallel to said first axis (this second axis is preferably perpendicular or orthogonal to said first axis). The position of the lens is also preferably identified by a physical sensing means which identifies the actual position of the objective lens rather than merely measures current/voltage applied to moving means attached to the objective lens.

Another improvement resides in a surface inspection device that utilizes one or more confocal microscope assemblies to determine if surface features, such as solder paste and ball grid arrays, are within a specifiable height range. The system consists of one or more confocal microscope assemblies with the objective lens of each assembly offset vertically in relation to each other and the sample and a means for scanning the focal point of the microscopes across the features of interest. The relative position of the lenses and the sample determine the limits to be tested. A computational device collects data from the confocal microscopes and determines if the height of a feature on the sample falls within the desired height range.

The present invention also uses the confocal microscope to quickly determine if sample features are within a preselected height range. The invention is relatively low cost and has the possibility of very fast acquisition rates. The invention consists of a confocal microscope or microscopes which direct their focal point(s) across a sample, by either moving the microscope or sample or both, at a preselected height above the sample surface. Data from reflected light is returned to the detector of the confocal microscope and is analyzed by a computational device or signal processor to determine if the desired feature is present at the height scanned. By scanning at two or more heights, it can be determined if the sample features are above, below or within the height range scanned. This method does not produce a continuous surface profile but only determines if the sample has features that are above or below a given height.

Calibration of the XZ plane of a 3D optical metrology device such as a confocal laser scanning microscope (CLSM) can be accomplished by imaging an inclined 2D standard element (e.g., a standard target element with precisely known and mapped and recorded features) with a known geometry. The differences between the location of features on the standard as indicated by the metrology device and the known locations of those same features are used to generate a calibration function or lookup table. The calibration function or lookup table will be applied to other images taken by that instrument to yield images with a known accuracy.

The confocal laser scanning microscope (CLSM) is capable of resolving features down to sub-micron dimensions. There are linear and non-linear errors associated with the indicated feature location. Through calibration of the image, the magnitude of these errors may be reduced. The process described assumes that one of the axis errors, hereafter referred to as the independent axis (e.g., the Y axis) can be isolated from the other two axis errors, hereafter referred to as the dependent axis (e.g., XZ axis). It is also required that the motion of the independent axis be linear. The goal of calibration using this method is to duplicate the process of acquiring data in the same manor as is used during the imaging of a sample.

The device for this invention consists of a fixture that holds two targets. One target is to be oriented normal to the optic axis of the confocal microscope (hereafter referred to as the horizontal target). The second target is oriented at an angle relative to the horizontal target (hereafter referred to as the inclined target). The targets contain a 2D image with a pattern that will mark at least three reference locations on the surface of the target. The coordinates of each of these reference marks are determined with a precision of at least twice that required for calibration ( such as an interferometer). The substrate of the target is any material that will provide a mechanically and thermally stable base for the pattern overlay and have an optical contrast with the pattern overlay. Typical substrates are glass, fused silica, and silicon.

As few as three reference markers may be used to calibrate the device if the errors are highly linear. Normally the errors to be removed through calibration are not highly linear and additional markers will need to be examined to fully calibrate the device. Prior to using the device to calibrate a CLSM, the relationship (distance and angles) between the reference marks on the horizontal target and the reference marks on the inclined target are measured by some device with a greater precision than the device to be calibrated (such as an interferometer). This will allow the determination of relative positions and angles when scanning the fixture.

Each axis of motion for the CLSM will have six degrees of freedom; typically referred to as X, Y, Z, roll, pitch, and yaw. One or more of these motions will be the desired movement effecting the translation and/or rotation of the scanning optics. All six degrees of freedom must be characterized over the full range of motion to fully calibrate a given axis. If multiple axis are characterized simultaneously, some of the error modes will be additive (e.g. the roll angle of the X axis may be added to the pitch angle of the Z axis.

Calibration of the independent axis is performed by use of the horizontal target. The plane of the target is oriented so that the two or more reference marks on the target fall on the vector of travel for that axis. An image of the target is acquired over the length of travel for that axis and with sufficient width and depth to allow recognition of the reference marks. The positions of the reference marks are measured and compared to the absolute locations and the differences are used to construct one or more calibration functions or lookup tables (LUT).

Calibration of the dependent axis is performed using both the horizontal target and the inclined target. The fixture is aligned so that the horizontal target is perpendicular to the optic axis and the slope of the inclined target is parallel to the independent axis. An image of the horizontal target is acquired so that the orientation of the inclined target can be determined. Without moving the calibration device, an image is acquired of the inclined target. Based upon the predetermined relationship between the horizontal and inclined target the true coordinates of the reference markers on the inclined target are determined and compared with the measured positions of those same reference marks as measured on the image. The differences between the true position and the measured position are used to create a construct one or more calibration functions or lookup tables (LUT).

BRIEF DESCRIPTION OF THE FIGURES

FIG. 20 illustrates a light source incident on a human eye.

FIG. 21A and 21B illustrate the topography of features on the human eye.

DETAILED DESCRIPTION OF THE INVENTION

Figure 1:
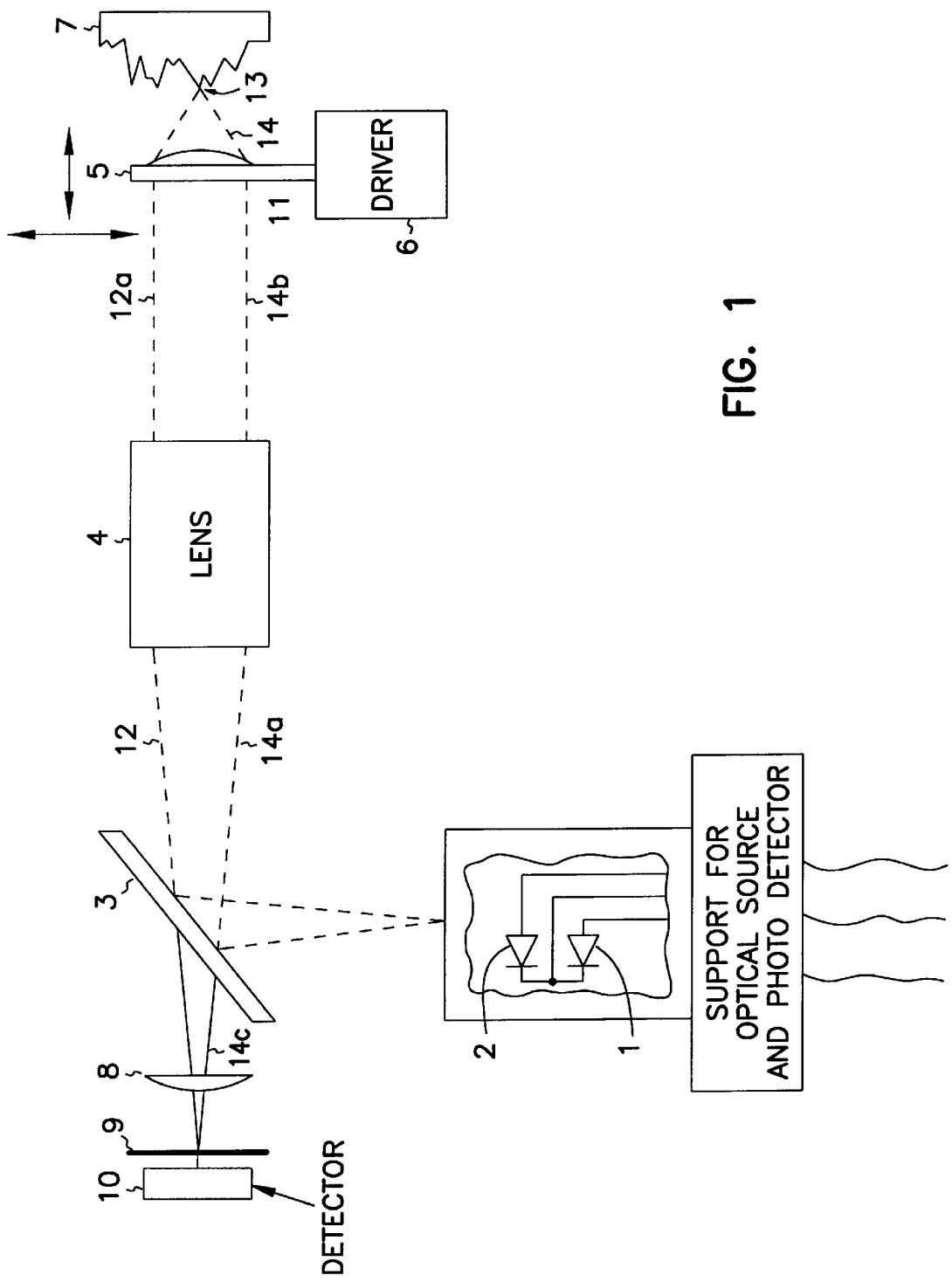
FIG. 1 shows a typical optical configuration used in the invention.
Figure 2:
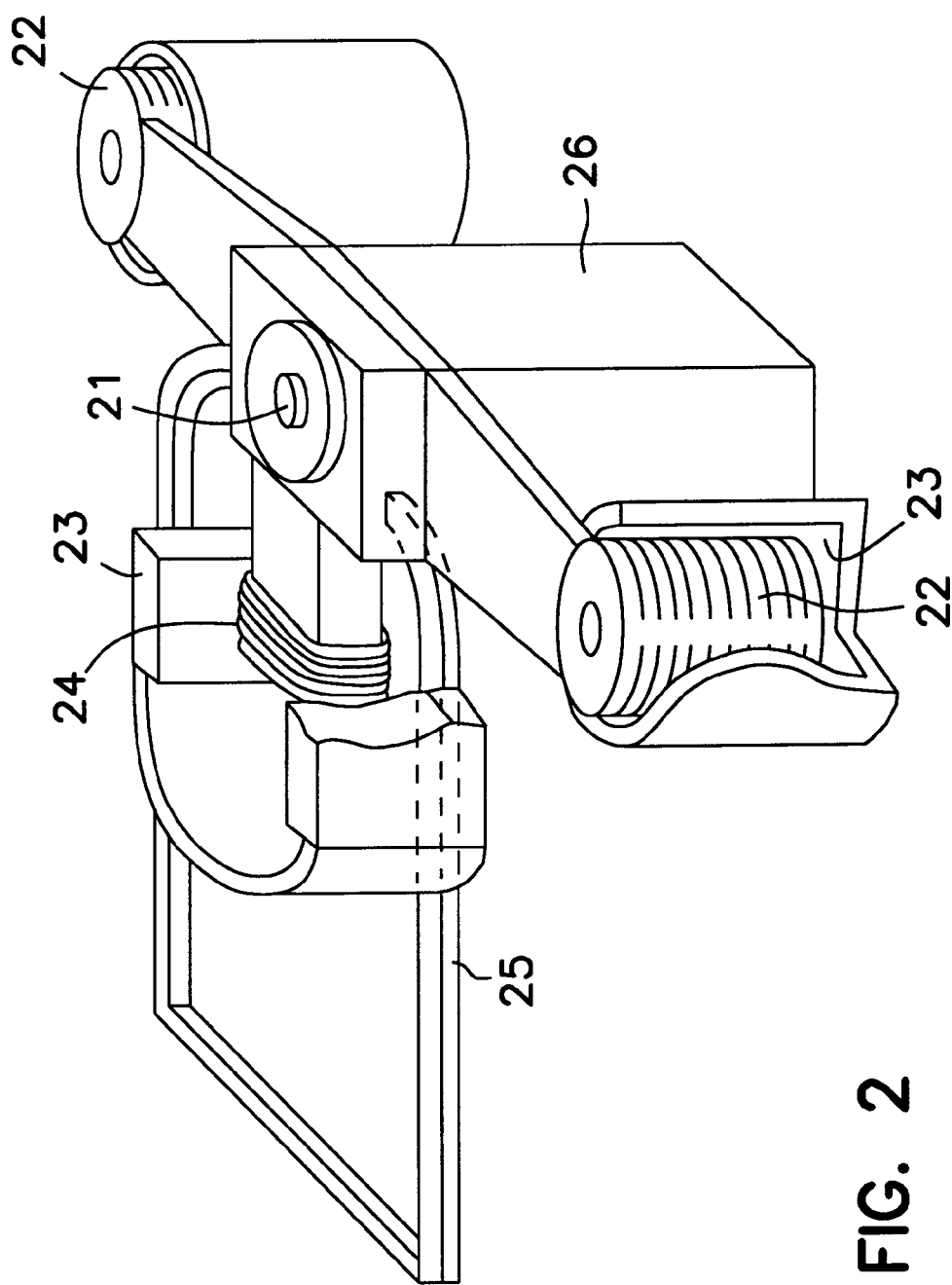
FIG. 2 shows an electromagnetic scanning assembly for the microscope objective.
Figure 3A:
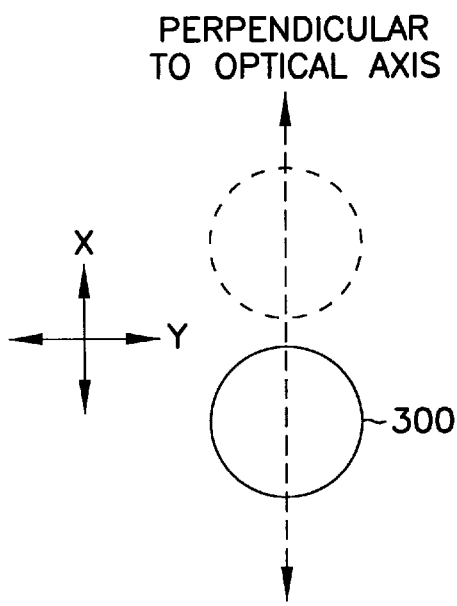
FIGS. 3A, 3B, 3C and 3D show movement of the objective lens in linear movements (FIGS. 3A and 3B) and arcuate movement (3C and 3D).
Figure 3B:
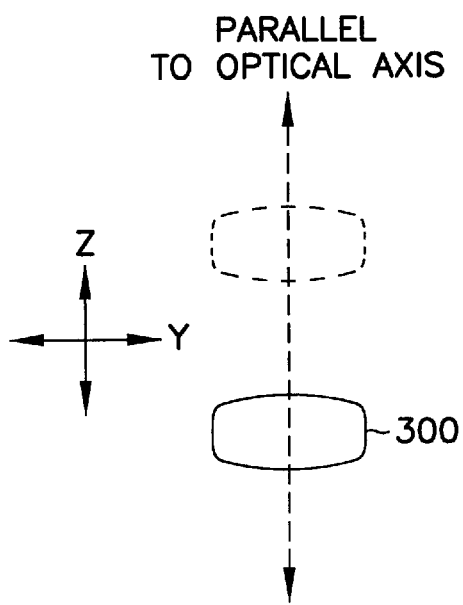
Figure 3C:
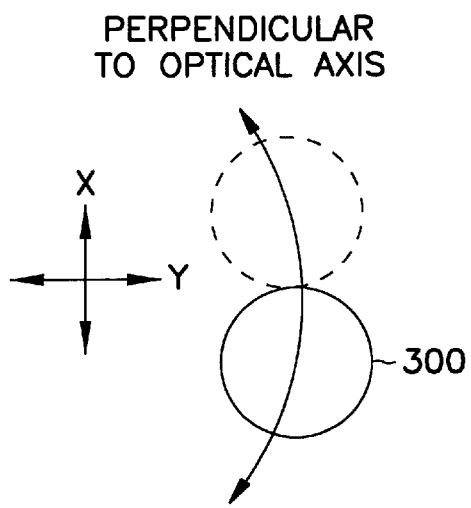
Figure 3D:
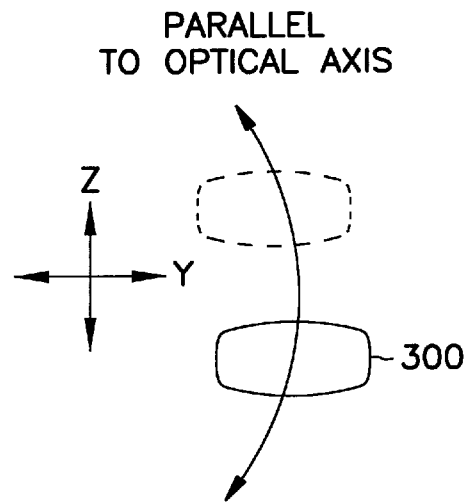
Figure 4A:
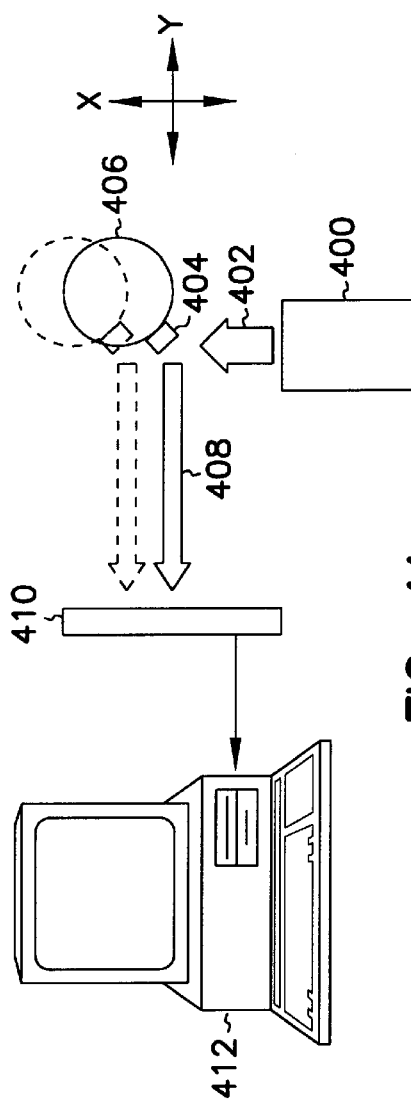
FIGS. 4A and 4B show a flow diagram of information from detectors being sent to a computer with a reflector on the objective lens.
Figure 4B:
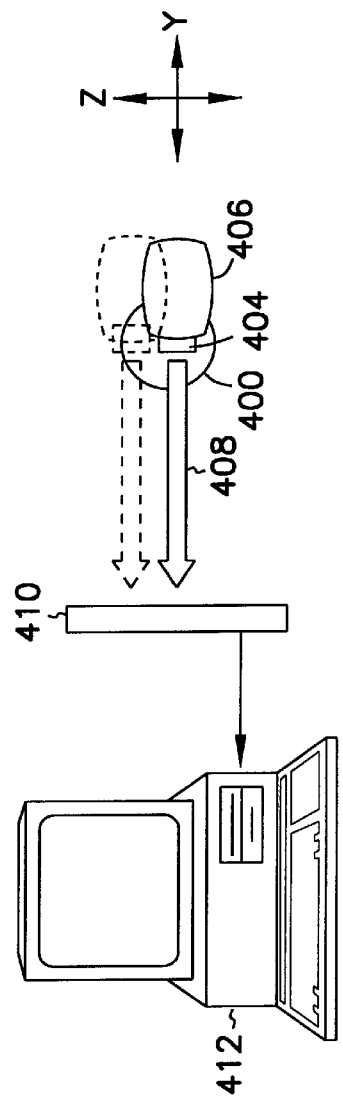
Figure 5A:
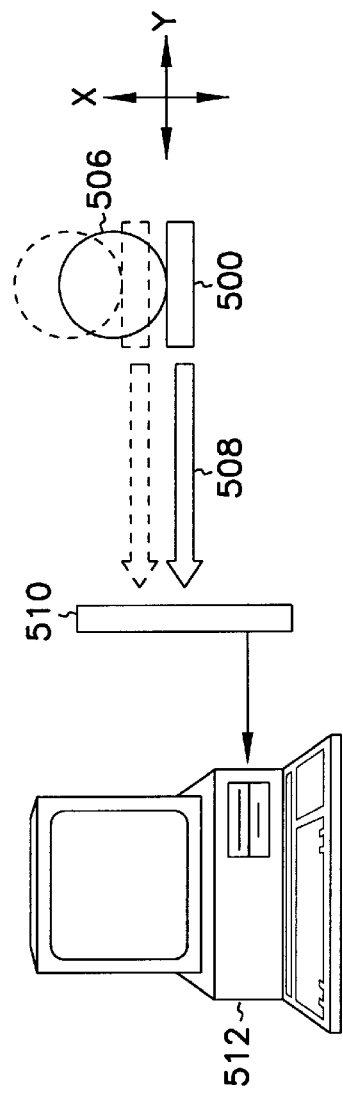
FIGS. 5A and 5B show a flow diagram of information from detectors being sent to a computer with a secondary light source attached to the lens.
Figure 5B:
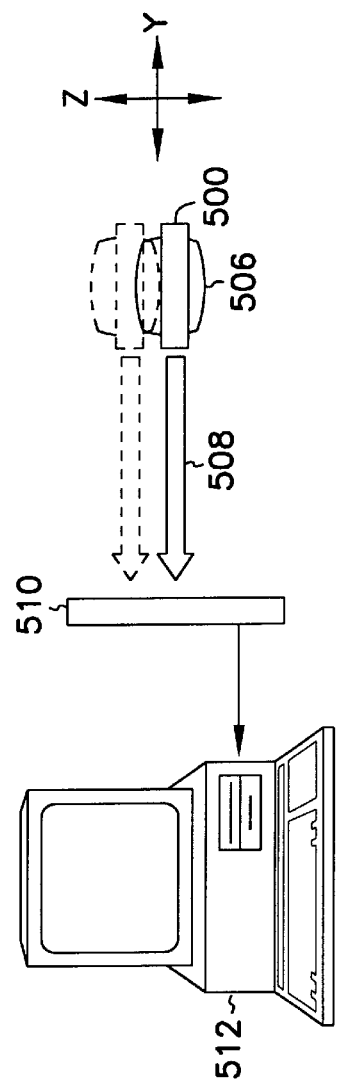

The present invention describes a compact confocal microscope utilizing a low mass objective lens (and therefore capable of using a low mass drive system for the objective lens) which is driven by a high speed drive characterized by low mechanical resonance which drive can move the lens in at least one and preferably two dimensional space (preferably independently along two distinct axes, more preferably where the at least two axes are each orthogonal to each other) so that the focal point of the lens can sweep or determine a plane or a volume by its movement. By low mass objective lens is meant a lens having a weight of less than 2.0 grams, preferably less than 1.5 grams, more preferably a mass of less than 1.0 grams, and most preferably a mass between 0.05 and 0.8 grams, most preferably less than 0.3 grams. The actual weight of the objective in the present preferred construction is 0.13 grams. The present microscope can be compact, lightweight, have good spatial resolution, have low power needs, and have a simple optical design. The weight of the preferred drive source (including coils, flexible support material, plastic frame and the objective was 1.9227 grams. A preferred weight range for an entire drive source would be from about 1 to about 5 grams. The basic configuration of the components, 1–10, of the microscope (not shown) is shown in FIG. 1. Light 11 is provided by a source such as a laser diode 1, with the optical power being regulated by a feedback system driven by photodetector 2. A portion 12 of the radiation output 11 of the optical source 1 is reflected by the beam splitter 3 and is collimated by lens 4. The continued movement of that portion 12 of light 12a is focused by a low resonance, low mass movable objective lens 5 which may be supported by flexible material (not shown). The objective lens 5 is translated by a driver 6. When a portion of the sample 7 (target or object) is within the focal point 13 of the objective lens 5, light 14 returns to the beam splitter 3 along path 14, 14a, 14b. A fraction 14c of the incident returned light 14 illuminating the beam splitter 3 passes through to lens 8 and is focused onto a pinhole aperture 9. The amount or intensity of light detected by detector 10 is related to the distance from the focal point 13 to a reflecting or emitting portion of the sample 7 in line with the beam axis (not shown). FIG. 2 illustrates a low resonance movable objective lens 21 supported by a flexible material 25, driven in two axes of motion by a set of electromagnetic voice coils 22 and 24 interacting with permanent magnets 23 on the fixed portion of the optical assembly. FIG. 2 shows a system capable of moving the focal point in a direction co-linear with the beam path, and in one direction perpendicular to the beam 12a. Alternatively, the objective can be driven in one, two, or three axes by low resonance scanning systems, with the motion of other axes being provided by high resonance or low resonance drives translating either the objective-scanner assembly, the sample, or both.

The confocal microscope of the present invention can be characterized by its ability to provide unique attributes to the optical capacity of the system. The microscope can be provided with a short working length (e.g., between 0.1 and 5 mm, preferably between 0.1 and 2 mm) while providing high resolution of less than 1 micrometer spot size, preferably less than 0.75 micrometers and most preferably less than 0.5 micrometers spot size (resolution). The microscope of the invention can be provided with the ability to move the objective lens independently along at least two distinct axes, with independent movement along at least two orthogonal axes.

The resonance of the objective lens and drive system is defined by a mechanical quality factor 'Q'. Q is defined as the number of oscillations required for the amplitude of the objective lens (in one axis) to drop to 1/e of the maximum amplitude of the oscillation after the drive signal is removed. In this system, 'Q' is measured by producing a steady state oscillation using an appropriate drive signal. The amplitude of the scan is measured, then the drive signal is removed. The Q is the number of oscillations required for the amplitude of the scan to be reduced to 1/e of the scan length when driven. The resonance Q of at least one axis of the scan should be less than 10, preferably less than 5, and most preferably less than 2. For further example, assume that a sine wave provided by a function generator is used as the drive signal for one voice coil that is providing motion of the objective lens in one axis. The sine wave is a 2 Hz wave having a peak-to-peak amplitude of 1.8 volts. The resultant amplitude in the oscillation of the objective lens is 1.5 mm peak-to-peak. When the drive signal is removed, the oscillation drops to 0.552 mm in less than 1 oscillation. In this case, the Q of the system (0.552/1.5) is less than 1.

As noted above, the f-number for the Keyence system appears to be about 2. The f-number is well understood in the art to be defined as the focal length of the lens divided by the clear aperture diameter. The spot size and the depth of field of the focal point are closely related to the f-number of the objective lens. The larger the f-number, the larger the spot size and the depth of field. A large spot size would be undesirable for a microscope, reducing resolution. The Keyence displacement device described above is designed to have a large working distance. To provide this feature, a large f-number objective lens is required which sacrifices resolution in favor of an increased spot size. It appears, although it can not be authoritatively stated without disassembly of the Keyence confocal microscope, that the objective lens is no greater than 5 mm and the objective lens has an f-number of no less than 2. In the present invention, the f-number of the system is preferably less than 1.5, more preferably less than 1.25 and still more preferably less than 1.0. The f-number of the actual working model of the confocal microscope of the present invention is 0.936. A benefit of the present construction is to have the maximum resolution possible within a scannable volume of about 3.5 cubic millimeters and therefore the relatively large f-number is unacceptable for that system.

A surface can be profiled in two or three dimensions by either sampling the full area of a rectangular slice or a full volume. Alternatively, the low mechanical resonance design of the microscope allows an objective lens to operate with a reduced amplitude of oscillation and a higher oscillation rate. The oscillation which occurs in the practice of the present invention is the movement of the focal point (by way of movement of the means for moving the objective lens and the resulting movement of the objective lens) within the boundaries of its ability to move. The oscillation does not have to be between the absolute extremes of the limits of movement of these elements (the moving means, the objective lens and the focal point), although the oscillation may include either or both extreme ends of the movement range. The movement may be narrowly within the limits of the range of movement based on estimates or actual measurements (taken in real time on the fly during operation of the microscope) of the variations in the surface of the target or object being examined. In this manner, the time required to scan a surface can be reduced by scanning a specific area or volume containing a region of interest. The oscillation of the focal point can be approximately centered on the surface of the sample by applying an offset current to the driver, providing an oscillation force to the objective lens, or by providing a translation in the axis of the oscillation of the focal point by either moving the objective assembly or the sample. The proper value of the offset current or translation of the sample or objective assembly can be determined from the difference between a determination of the position of the surface of the sample by photodetector 10 during oscillation of the objective lens and the position that represents the center of the scan. The proper value of the offset current can also be determined by a lower resolution mapping of the profile of the surface, computing a predicted proper value of the offset current for a number of positions over the scan area of interest, and providing the offset current to the driver. A low resolution map of the surface can be generated by fixing the objective lens at a fixed position in the focus axis while rapidly raster scanning the surface of a sample and determining positions where the sample's surface is in focus. By sequentially moving the objective lens to a new position and scanning the surface again (and repeatedly over the range of movement of the objective lens or until surface values have been determined for the entire surface), a contour surface can be generated. The predicted surface can be used in subsequent high resolution scans by using interpolation of the contour surface to calculate the proper offset current for the oscillating objective lens. In cases where the prediction is incorrect or not within the desired tolerances for the generated data and the focus is not detected within the scan length, the oscillation amplitude can be increased as required, and, if necessary, the area of interest can be rescanned.

The scanning of the objective lens does not have to be in orthogonal axes. For example, the objective lens may be mounted such that the lens oscillates in an arc. This may be the preferred mode since this motion can be easily provided with mountings possessing a low mechanical hysteresis.

The position of the focal point when an in-focus signal is provided by photodetector 10 can be determined by the relationship in timing between the driver current or voltage being provided to the driver and the in-focus signal. The mathematical relationship between the driver current or voltage, the in-focus signal, and the calculated value for the position of the focal point can be obtained by simple prediction or by previous calibration and the use of a look-up table. The accuracy of the calculation of the position of the focal point can be further improved by a reference signal provided by the scan of the focal point. For example, the position of a window interposed between the microscope objective lens and the sample can provide a set of in-focus reference signals for every oscillation of the objective lens, and the time between the reference signal and the in-focus signal from the sample can be used to calculate the position of the sample from the reference window. The reference signal is not required for every oscillation of the objective, for example, the window can be used to provide calibration data for the relationship between the phase of the drive current and the oscillation of the objective lens only on a periodic basis.

Other means than pinhole detection for determining the positional relationship between the focal point of the objective lens and a surface may be used. For example, means for determining focus commonly used in compact-disk players may be utilized. In this case, the signal detected by the focus sensing photodiodes will be substantially more complex than with a pinhole detector. In spite of this complexity, the focus positions may be determined by analyzing the rate of change in the detected signal. A common system for determining the focus position in compact disks is an astigmatic lens imaging the light reflected by the surface of the sample onto a quadrilateral photodetector. An infocus condition is indicated by a peak in the first derivative in the difference of photodetectors (A+B)−(C+D), where A:B and C:D detector pairs are each diagonals on the quadrilateral photodetector. The focusing methods used in compact disk players allows the surface to be identified during the scanning of the objective lens. The use of a quadrilateral focus detector also allows a surface to be followed during a lateral scan, where the position of the objective lens is maintained at a constant distance from the surface during the scan. In this case, the output of (A+B)−(C+D) will be used to provide error information to continuously correct the position of the objective lens. The absolute position of the lens can be recorded during a one or two axes lateral scan, allowing the profile of the surface of the sample to be generated from the measured or calculated position of the objective lens determined in an array of lateral positions during the scan. There are also limitations to the use of the quadrilateral detection schemes. A rapidly changing topography in the surface can be difficult to track with that system. Certain types of surface geometry can cause false positive signal detection because of light reaching the detector which is not at the focal point of the objective lens. The quadrilateral detection system also tends to be more susceptible to optical noise and stray light than a pinhole detection system. This is a result of exposure of the quadrilateral detector to an unisolated optical environment. Additionally, the quadrilateral detector systems which may be modified for use in the present system do not create an image and are not used for resolving an image or even measurably detecting changes in a surface. The quadrilateral detection systems maintain focus of a beam at a specific distance onto a surface for purpose of reading programmed information off that surface. The quadrilateral detector is not reading the beam itself for information, but merely reading the quadrilateral spread of the beam to maintain a specific distance relationship between elements in the compact disk system.

The position of the objective lens has to date been determined by prior calibration between the drive current and the lens position, via the timing methods discussed above, or may be much more accurately and consistently measured by absolute measurement of the lens position. Methods for determining the absolute position of the objective lens includes capacitive detectors, direct or indirect light sources mounted on the objective lens and illuminating a one or two axis position sensing diode, or an optical interferometric system. Methods for indirectly illuminating a position sensing diode includes attaching a pinhole or small mirror directly onto the objective lens' mounting. The pinhole or mirror is illuminated with a fixed source of light such that the illumination is provided over the entire scan dimension or dimensions. Light selected by the mirror or pinhole will may illuminate a position sensing photodiode, which in turn, provides a signal proportional to the displacement of the beam in one or two axes. This displacement will correspond to changes in the position of the objective lens. Acquisition of the signal from the position sensing diode may be simplified by pulsing the illuminating light when a measurement is required. This may simplify the timing of the sample-and-hold circuits used for digitization of the signals. Using pulsed lights will also result in a generally higher potential signal-to-noise ratio in the signal detection for the same average power light source.

Interferometric measurement systems may be independent of or coupled with some of the optics in the confocal microscope, using for example, the same laser diode and beam splitter as the microscope. In the coupled application, a surface portion (near or at, and attached to or part) of the objective lens illuminated by the laser diode will reflect the light such that the reflected light will interfere with light provided by a reference mirror. The modulated light emitted by the beam splitter can be detected by a photodetector and used to determine the absolute position of the objective lens during a scan.

The preferred driver of the objective is an electromagnetic voice coil. Voice coils can provide a driver with low mass for the portion of the driver rigidly connected to the objective lens. The drive current for the voice coil can range from a simple sine or square wave to a waveform optimized so that the scanned objective lens is at a constant velocity for a maximum fraction of the total scan time. An example of such an optimized waveform is pulsed current applied to the driver to reverse the scan direction and little or no current applied to the coil during the portion of the scan wherein measurement occurs. Other drivers such as piezoelectric or electrorestrictive elements are also suitable for this invention.

The mass of the objective lens and the portion of the mechanical driver rigidly attached to the objective lens should be of low mass. Preferably, the combined mass of these two portions should be under 5 grams for an acceptable combination of drive power and total mass of the microscope. Most preferably, the mass of the objective lens and attached driver will have a mass of under 3 grams.

EXAMPLE

This example was used to determine the usefulness and accuracy of having a reference signal generated by a relatively thin, (compared to the focus scan amplitude) transparent object, i.e. cover glass window, transparent polymer film, and the like, placed between the sample being scanned and the moving objective. An in-focus signal that corresponds to a reference signal will be generated when the focal point of the laser beam is on either surface of the reference object. Hence, up to two reference signals will be detected before the data signals and then up to two reference signals will be detected after the data signals.

A Sony model KSS-240a CD player optical head (having a quadrilateral detection unit) obtained from a Sony model CDP-311 compact disk player was modified such that motions of the objective lens in the axis of the laser beam, i.e. the focus axis, were driven by a 2 Hz triangle waveform. The amplitude of the waveform caused the objectives amplitude of motion to be 2 millimeters, therefore the depth of field during this particular experiment was also 2 millimeters. A 15 micron thick transparent polymer film was placed between the objective lens and a sample of aluminum foil, such that the surface of the polymer film was perpendicular to the axis of the laser beam. In-focus signals were detected by the quadrilateral detection unit attached to the optical head. These signals were then amplified and acquired then digitally stored in a computer. A plot of the stored data clearly showed the expected two reference signals followed by two data signals followed once again by two reference signals. The reference signals were denoted by their spacing on the plot, which is indicative of the thickness of the plastic film. The data signals also had lower intensity due to lower reflectivity of the plastic film compared to the aluminum foil. To gain a more precise sense of where the in-focus signals were, the first derivative of the data was also plotted. This plot showed the most rapid rate of change in the data to be at the in-focus positions.

During this experiment, the amplitude of the objective lens' motion was lowered to 0.5 millimeters and the plastic film was replaced with a 1 millimeter thick silica window. A dc bias voltage was then applied to the 2 Hz triangle waveform to offset the center of the objectives motion, thereby enabling the focal point to be placed on either side of the window and generating only one in-focus signal. The microscope can utilize this bias voltage to follow a surface of a sample, or to view at a selected depth within a sample.

Another significant potential for this microscope would be to have the scanned data on the shape, curvature and irregularities on the surface of the eye captured in data form, used to generate a mold conforming to the external measurements and shape of the eye, and then having contact lenses molded in that configuration for use on the patient's eyes. For example, the data could be used with a laser to ablate an exactly configured lens from a polymer preform lens, the data obtained from the confocal microscope of the present invention being used to precisely shape the lens according to the precise data obtained from the confocal microscope. The special features already described for the confocal microscope of the invention enables the eye to be scanned in specialized (optimized) ways. The scanning pattern does not have to be in an orthogonal (raster repeated) manner. The focal point, because of the multiple axes controls, can be moved in a circular or spirographic pattern to minimize scan time. Multiple scans by these various methods may be used, the data compared, and a more accurate mapping effected by an averaging of the two or three different methods (e.g., circular, spirographic, raster scanning).

Figure 6:
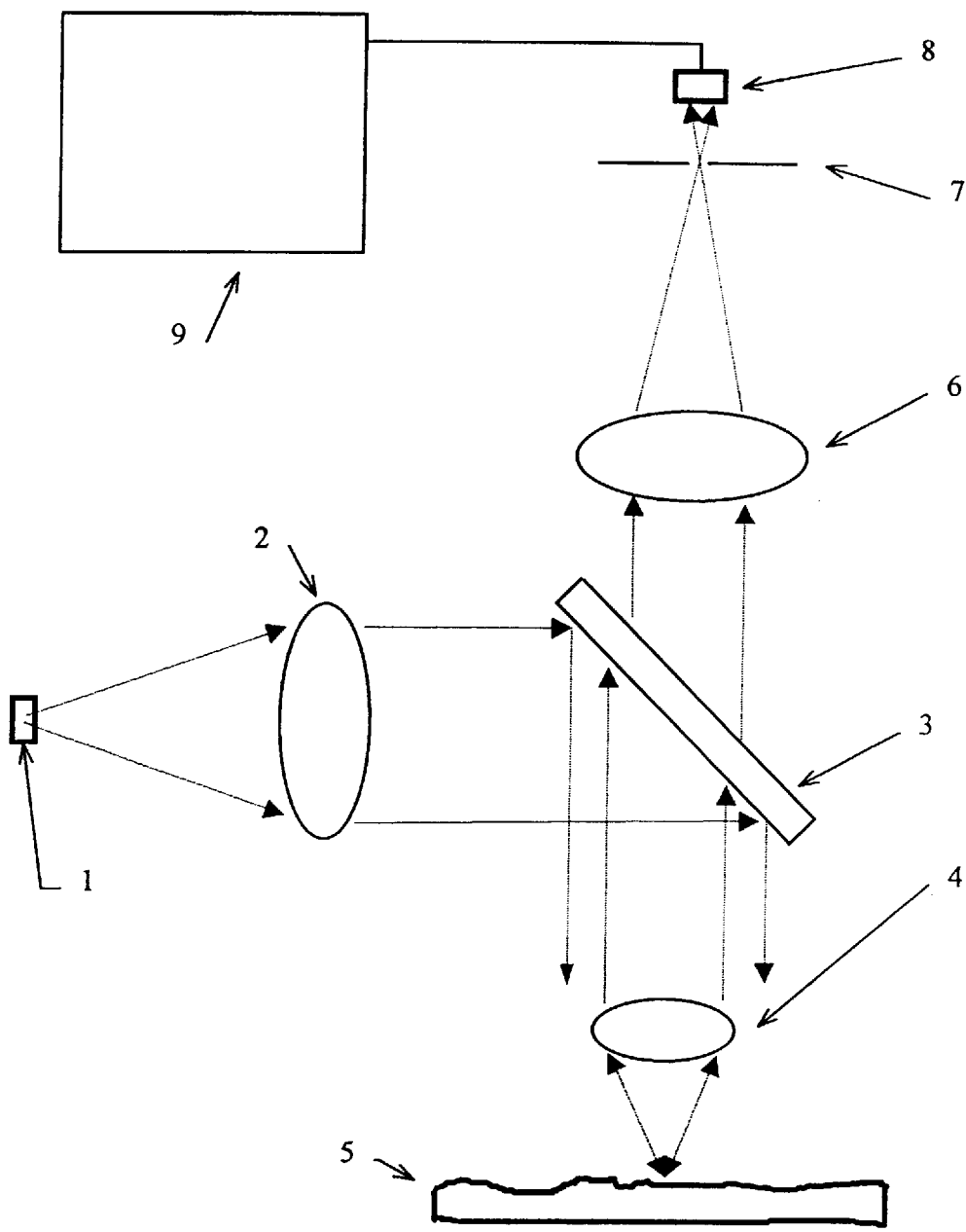
FIG. 6 shows a multi-axes objective scanning confocal microscope configuration according to one aspect of the present invention.

FIG. 6 illustrates a objective scanning confocal microscope consisting of 1 a light source, which may include a focusing lens 2, which produces a light beam. This light source is typically a laser emitting in visible or infrared radiation, where the emitted light reflects off of a beamsplitter 3 where it over illuminates an objective lens 4 so that as it scans its aperture is always filled as it is scanned by the scanning mechanism 5. In the multi-axes objective scanning confocal microscope, the objective lens is capable of motion in at least two dimensions, with typical operation having one axis parallel to the optical axis and another scanning axis perpendicular to the optical axis. The objective lens 4 focuses the incident light to a focal point which is then scanned through the sample 6. Light reflected or emitted from the sample 6 is collected by the lens 4 then passes in part through the beamsplitter 3. This returned light is then focused by a spatial filter lens 7 onto the spatial filter 8. A significant amount of light passes through the spatial filter 8 only when the sample surface 6 and focal point of the objective lens 3 are coincident. The light passing through the spatial filter 8 is received by a photodetector 9 whose output signal is read by a computing device or signal processor 10 which is then used to generate description of the sample 6.

Figure 7:
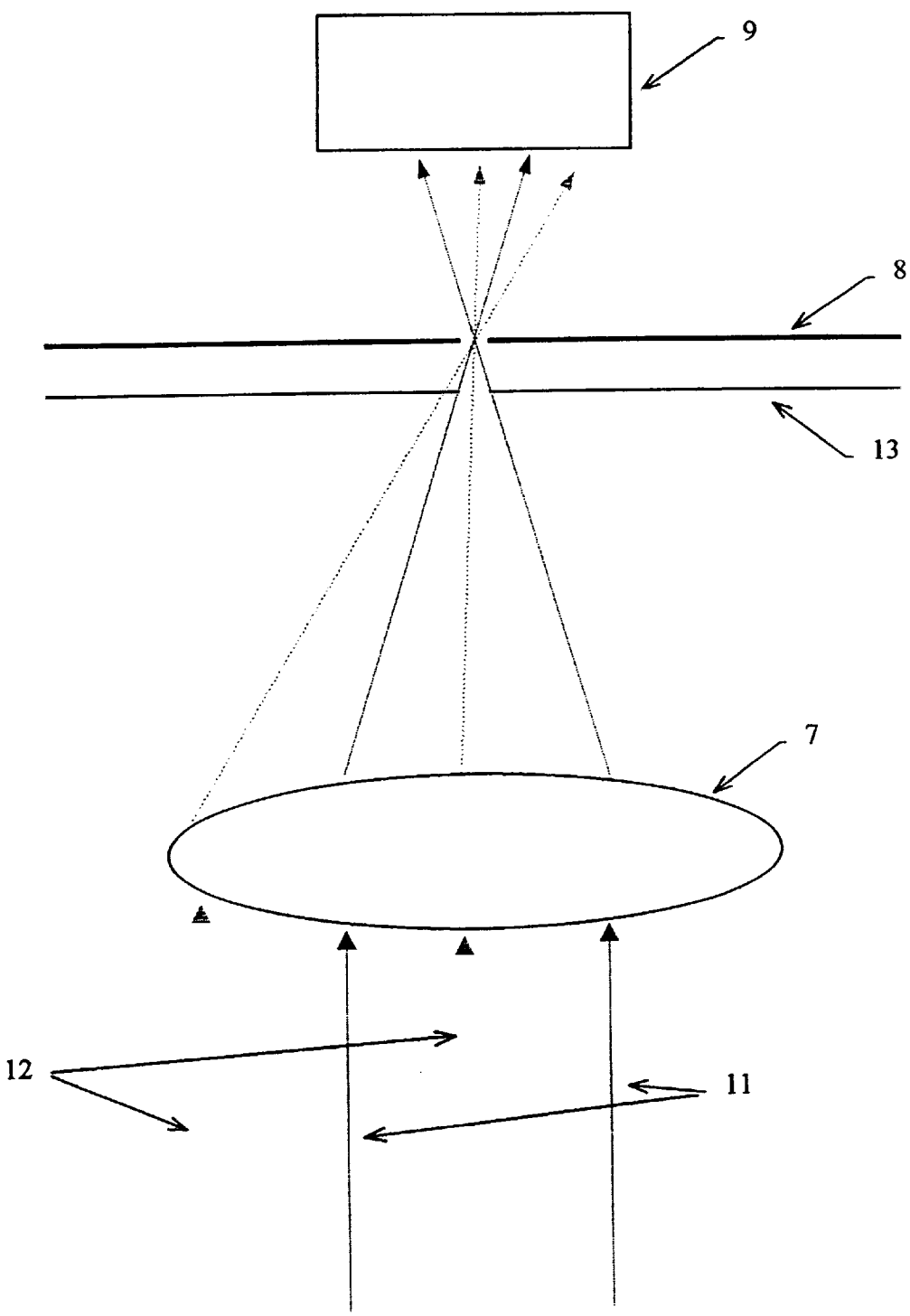
FIG. 7 shows light returned from a sample entering a spatial filter at different objective lens positions and how alignment of the spatial filter is critical in this system.

In FIG. 7, spatial filter lens 7, spatial filter 8, and photodetector 9 are shown in detail. Ray paths 11 show light returning from the sample when the objective lens is centered on the spatial filter lens 7. Ray paths 12 show the light returning from the sample when the objective lens is scanned perpendicularly to the optical axis and is not centered on the spatial filter lens 7. The spatial filter 8 is shown in its optimum aligned position where the spatial filter 13 is shown misaligned. As is shown, when the spatial filter is misaligned 13, the on axis rays 12 still pass through the spatial filter 13 while those from off of the optical axis 12 are partially obscured. This illustrates the importance of precise spatial filter 8 alignment in the scanning objective confocal microscope.

Figure 8:
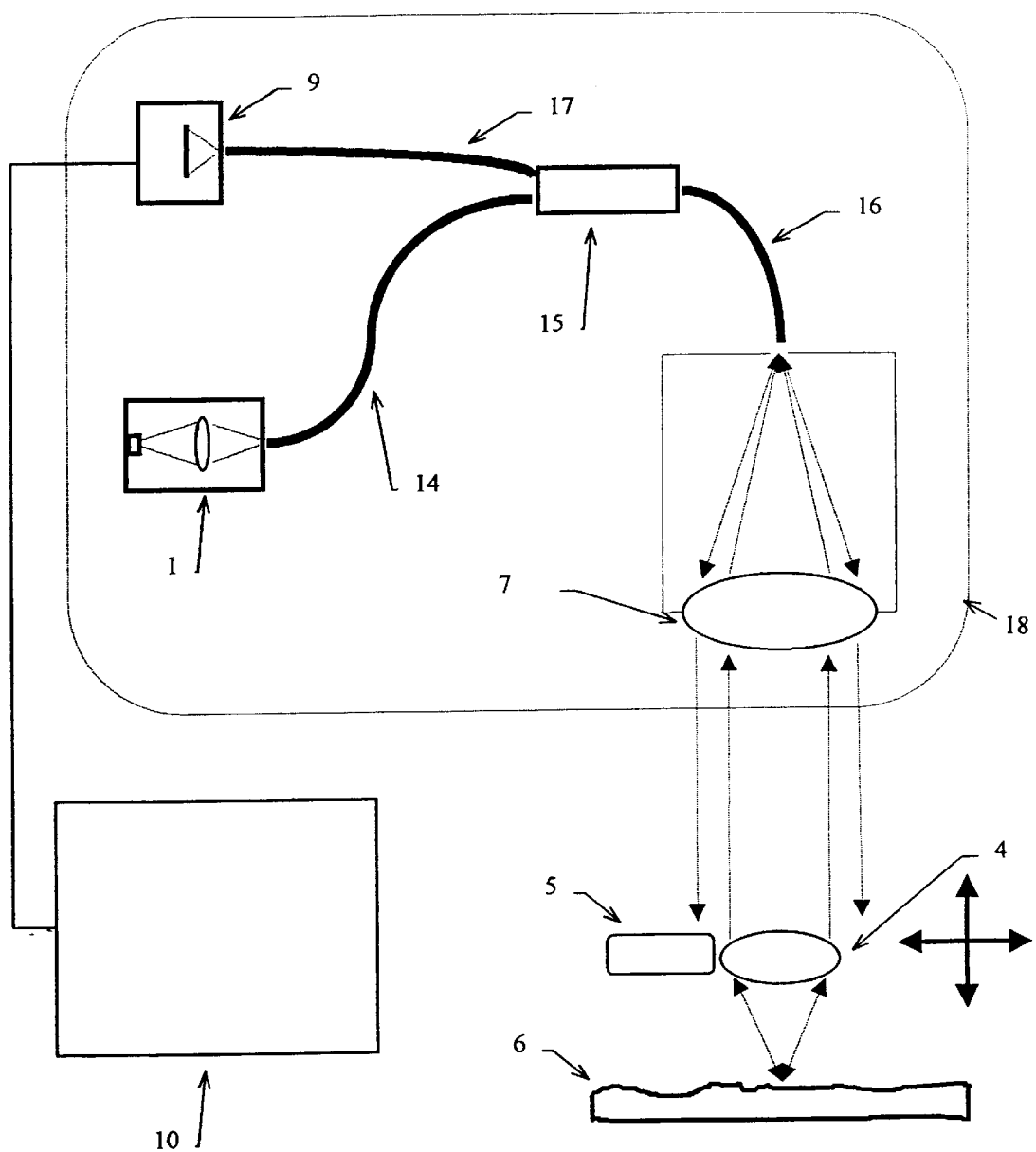
FIG. 8 shows a confocal microscope using a single fiber optic assembly as the source and detection aperture.

The optical configuration of a preferred embodiment is shown in FIG. 8. The light source 1 produces a light beam which is directed into an optical fiber 14 where at least 50% of this light passes through a fiber optic beam splitter (2×1 coupler) 15 then into fiber 16 where the light can be collimated using a spatial filter lens 7. This lens is not required but is desirable because it allows collimation of the light into the objective lens 4. The light emitted from the spatial filter lens 7 over illuminates an objective lens 4 which focuses the light onto a sample 6. Light reflected or emitted from the sample is collected by the objective lens 4 and returned to the spatial filter lens 7 where it is focused back into optical fiber 16. This light passes through the fiber optic beam splitter 15 where part of it is directed into fiber 17. The light passes through fiber 17 to a photodetector 9 whose output is read by a computing device 10 which is then used to generate a description of the sample.

Fibers 14, 16, and 17 are preferably single mode optical fibers, meaning that they can support only one optical mode (typically TEM$_{00}$) which has the benefit of producing a very high quality output wavefront which allows diffraction limited performance. Although single mode fiber is preferable, multi-mode optical fiber could also be used and would have the advantages of better source and returned light coupling efficiency which would allow a better signal to noise ratio. Multi-mode fibers which only support two or four optical modes could also be used which would allow various phase and amplitude contrast methods of confocal scanning to be performed. If single mode fibers are used, these could be polarization maintaining fibers which would allow measurement of the polarization of the reflected or emitted light which is useful for separating backscattered and reflected light from a sample. It may be beneficial as well to polish the end faces of the optical fibers at a slight angle to reduce back reflections. Back reflections may also be reduced by coating the faces of the optical fibers with a thin film anti-reflection coating.

The area enclosed by the rectangle 18 is denotes the fiber optic assembly which can be readily purchased with the components prealigned and fixed to a high degree of accuracy and stability, due to the prevalence of optical fiber suppliers for communication systems. The fact that this system obtained prealigned eliminates most of the aligmnent considerations in the multi-axes objective scanning confocal microscope.

Figure 9:
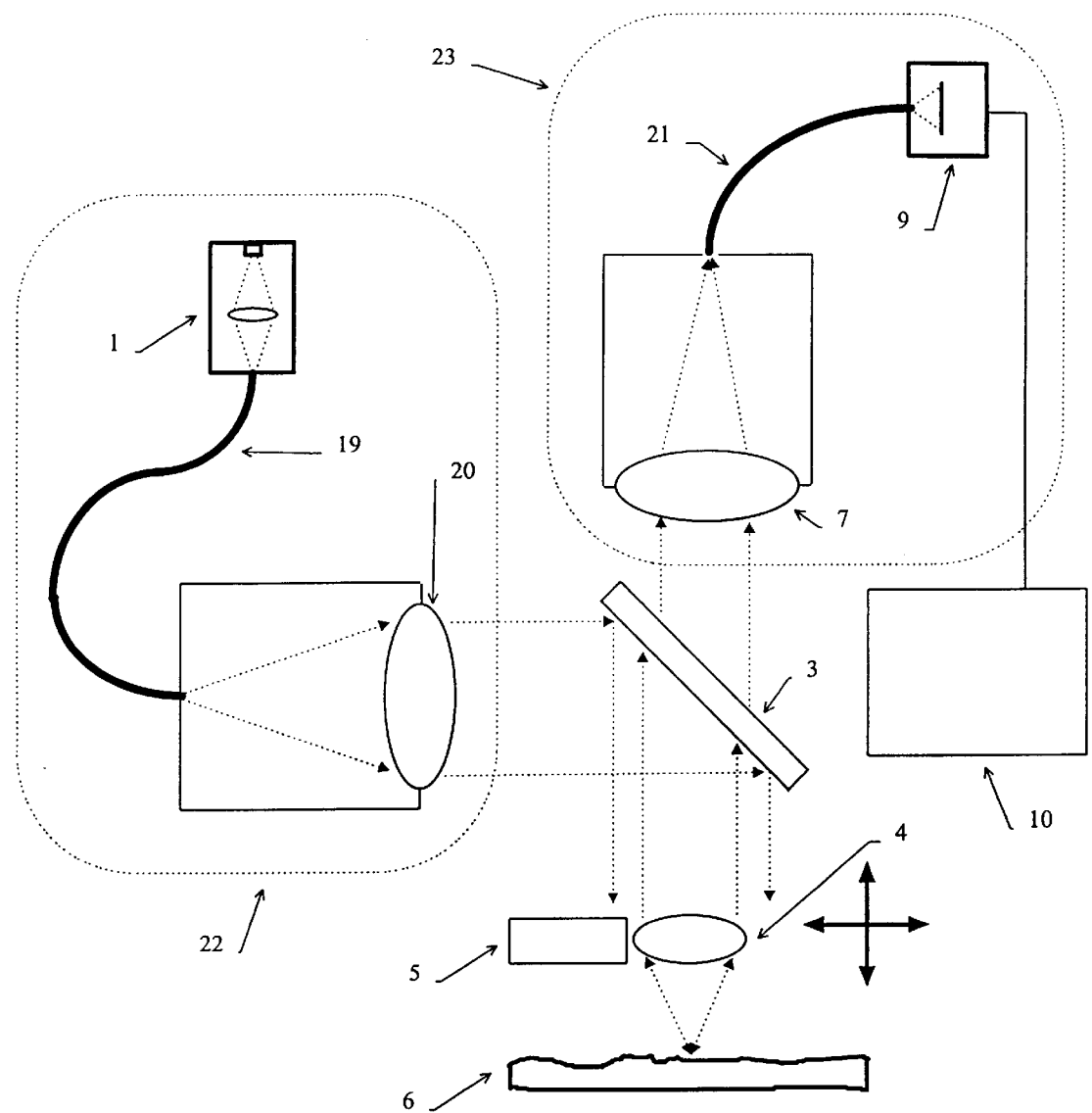
FIG. 9 shows a confocal microscope using separate fiber optic assemblies for both the source and detection apertures.

A second preferred embodiment is shown in FIG. 9. The light source 1 produces a light beam which is directed into an optical fiber 19 then through the source collimation lens 20 to the beam splitter 3. The light is directed from the beam splitter 3 and over illuminates an objective lens 4 which focuses the light onto a sample 6. Light reflected or emitted from the sample is collected by the objective lens 4 and returned through the beam splitter 3 to the spatial filter lens 7 where it is focused back into optical fiber 21. The light passes through the fiber 21 to a photodetector 9 whose output signal is read by a computing device or signal processor 10 which is then used to generate a description of the sample. The rectangles 22 and 23 denote the fiber optic assemblies that are readily available from multiple vendors.

This embodiment has the advantage of separating the source and detection systems which allows the source or detection arms to be changed without affecting the other. This would be useful for using multiple lasers with different wavelengths or multiple detectors with different spectral responses. The alignment of this embodiment is not as simple as that shown in FIG. 8, but it is still easier than that shown in FIG. 6. This is due to the fact that the spatial filter lens 7 and the spatial filter which in this case is the optical fiber 21 are prealigned to a high degree of precision.

As newer technologies become commercially available, such a blue semiconductive laser diodes, fluorescent microscopy and other assemblies where infrared radiation could be undesirable can be configured.

The confocal microscope of the present invention has been discussed primarily for its use as a purely microscopic tool. It does have direct application in other specific environments, such as mapping surface irregularities in vivos on the eye for use in the ophthalmic industry. As shown in FIGS. 20, 21A and 21B, the presently designed microscope can have its forward portions of such small dimensions that it can operate within the cavity of the eye fairly easily. Specifically, the confocal microscope of the present invention can provide information about the surface of the eye for use with eye corrective surgeries such as Photorefractive-Keratectomy (PRK) and phototherapeutic keratectomy. PRK is a laser ablative process which reshapes the eye to correct for myopic, hyperopic and astigmatic conditions. Information regarding the curvature of the eye about orthogonal axes provides a guide to how myopic, hyperopic or astigmatic a specific eye is. This information can be used to prescribe a laser treatment that is tailored for a specific patient. Information about other irregularities and features can be used in other corrective procedures.

It is commonly understood in the ophthalmic industry that the use of ablateable masks with the PRK procedure has significant advantages over current beam shaping techniques. An ablateable mask can be used to change the total distribution of energy to which the eye is exposed during the PRK procedure. To reshape the eye (e.g., change the overall curvature of the surface of the eye), various regions of the eye need to be ablated in a precisely defined manner and degree. For example, if the patient is myopic, the radius of curvature of the cornea is too small. To correct this condition with PRK, more material needs to be ablated from the center of the eye than from the surrounding areas. This effectively flattens the eye and increases the radius of curvature of the cornea. A similar procedure is effected with an expanding aperture or iris which exposes the center of the eye to more radiation than the surrounding tissue with a given number of laser pulses. In the present technology using a mask, the mask is differentially ablated or is proportionally thinner as needed for selective ablation of the mask and surface of the eye.

Information data from the present microscope can be used to map the surface of the eye with sufficient exactness as to enable ablative mask design and contact lens design.

One method according to the present invention for determining the absolute position of the objective lens (absolute with respect to either the position of the lens within the framework of the confocal microscope, its position along its line or arc of oscillation, or with respect to the sample surface) involves using a light beam which moves in conjunction with the objective lens to illuminate the surface of a device that is sensitive to changes in position of the light beam. The position sensing system in this case would be comprised of at least one of each of the following; a light sensitive detector with a signal output that corresponds to the position of a light beam on the surface of the detector (hereafter referred to as position sensor), light source, reflector, computer, and data acquisition electronics. The method involves indirectly illuminating the position sensor with a light beam wherein the position of the light beam (or intensity of the light beam if a non-collimated light source is used for the reference beam) on the surface of the position sensor is proportional to the actual position of the objective lens.

Lens position sensing using indirect illumination is accomplished by attaching at least one reflector (e.g., a mirror) to the objective lens and illuminating the reflector with a light source (either independent from the imaging light source or split off from the imaging light source) such that a portion of the light generated by the light source, a light beam, is reflected toward a position sensor(s) which in turn generates an electrical signal(s) that corresponds to the actual position of the objective lens. As the objective lens moves, the signals(s) from the position sensor(s) changes accordingly to correspond with the lens's new position. This is due to the fact that the reflector moves in conjunction with the objective lens which in turn changes the position of the reflected light on the surface of the position sensor thereby changing the output signal(s) by a proportional amount. The out (or output) signal(s) may now be acquired by data acquisition electronics and converted into digital data which is suitable for recording by a computer. Once the digital data is recorded by the computer, it may be calibrated with conventional software to correct for proportionality and non-linearities that may exist in the data. Using the computer and a calibration standard, a look up table (LUT) or a mathematical function may be generated which correlates the actual position of the objective lens to a given set of position sensor(s) signals. The LUT can now be used during subsequent scans to calculate, or estimate (if interpolation is needed,) the absolute position of the lens.

Another method of determining the absolute position of the objective lens involves using a light beam which moves in conjunction with the objective lens to illuminate the surface of a device that is sensitive to changes in position of the light beam. The position sensing system in this case would be comprised of at least one of each of the following; a light sensitive detector with a signal output that corresponds to the position of a light beam on the surface of the detector (hereafter referred to as a position sensor), light source directly mounted to the objective lens, computer, and data acquisition electronics. The method involves directly illuminating the position sensor with a light beam wherein the position of the light beam on the surface of the position sensor is proportional to the actual position of the objective lens.

Lens position sensing using direct illumination is accomplished by attaching at least one light source directly to the objective lens (i.e., a fiber coupled light source or a small light emitting diode). The directly attached light source generates a light beam which is directed toward a position sensor(s) which in turn generates an electrical signal(s) that corresponds to the position of the objective lens. As the objective lens moves, the signal(s) from the position sensor(s) changes accordingly to correspond with the lens's new position. This is due to the fact that the directly attached light source moves in conjunction with the objective lens which in turn changes the position of the light beam on the surface of the position sensor thereby changing the output signal(s) by a proportional amount. The output signal(s) may now be acquired by data acquisition electronics and converted into digital data which is suitable for recording by a computer. Once the digital data is recorded by the computer, it may be calibrated in order to correct for proportionality and non-linearities that may exist in the data. Using the computer and a calibration standard, a look up table (LUT) or a mathematical function may be generated which correlates the absolute position of the objective lens to a given set of position sensor(s) signals. The LUT can now be used during subsequent scans to calculate, or estimate (if interpolation is needed), the absolute position of the lens.

The light source utilized for the direct or indirect illumination techniques may be a portion of the primary illumination source of the microscope system or it may be an independent secondary light source. The light source, whether the primary or secondary, may be a light emitting diode, a laser, or a broad band light source such as an incandescent lamp.

The position sensor described above may be a single or multi-axis device, and it may be digital or analog. Examples of which include, but are not limited to; lateral effect position sensing device, split cell photodiodes, multi-element array photodiodes, charged coupled devices, charge injection devices, etc.

Readily available data acquisition electronics can be utilized for the direct or indirect illumination techniques, such as those manufactured by a number of companies including National Instruments Corporation of Austin, Tex. Depending on the type of PSD utilized the data acquisition electronics may need to be capable of analog to digital signal conversion which is commonly understood.

Confocal microscopes of all types use a spatial filter(s) to eliminate light that is not from the focal plane of an objective lens. Typically, this spatial filter (or filters) is quite small, on the order of microns or tens of microns. This small size usually means that alignment of the optical elements in the system is difficult and subject to misalignment during use due to vibration and thermal effects. One way of reducing alignment issues in scanned laser beam and Nipkow disk confocal's has been to use an optical fiber to introduce the light source and/or to collect the light returned from the sample under test. An optical fiber design can also greatly simplify system design by using the same fiber to introduce the light to the system and to act as the spatial filter which collects the light returned from the sample. An additional benefit of using an optical fiber to launch the system illumination is that if a single mode optical fiber is used, the fiber eliminates most aberrations due to the source (typically a laser source) and produces a diffraction limited, circularized output beam. Design aspects of a confocal microscope utilizing fiber optics are described in "Signal Level of the Fiber-Optic Confocal Scanning Microscope", M. Gu and C. J. Shepard, J. Opt. Soc. Am., 1991, A8:1755–1761; "Confocal scanning optical microscope using single mode fiber for signal detection", S. Kimura and T. Wilson, 1991, Appl. Opt. 30:2143–2150; and a practical description is given in the book "Handbook of Biological Confocal Microscopy, $2^{nd}$ Edition", edited by J. Pawley, Plenum Press, 1995.

Testing of a fiber optic assembly consisting of a pre-assembled fiber optic coupled diode laser, a 2×1 fiber optic coupler, a fiber freespace collimator, and a fiber coupled photodetector showed that the system was so easy to align that it could be align by hand. This test also demonstrated that the fiber was aligned extremely well because motion of the objective lens transverse to the optical axis of up to 0.5 mm produced only a 3–5% variation in the photodetector signal intensity.

Figure 16:
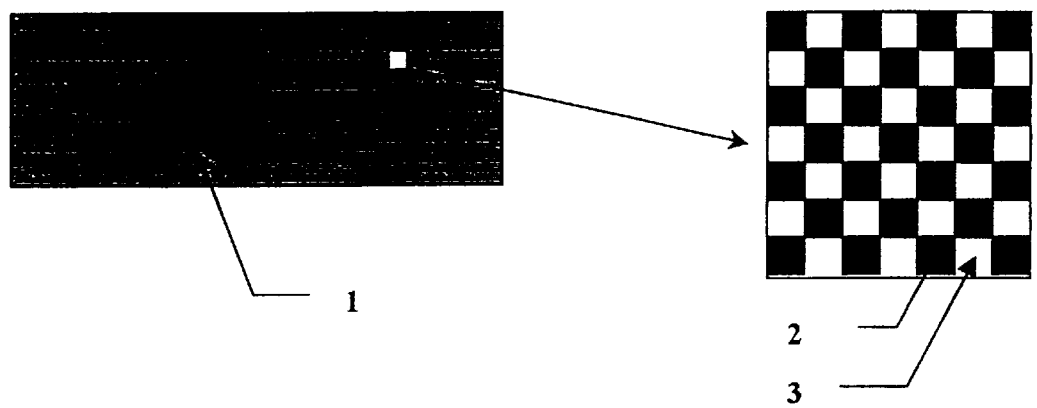
FIG. 16 shows a horizontal view of a calibration assembly.
Figure 17:
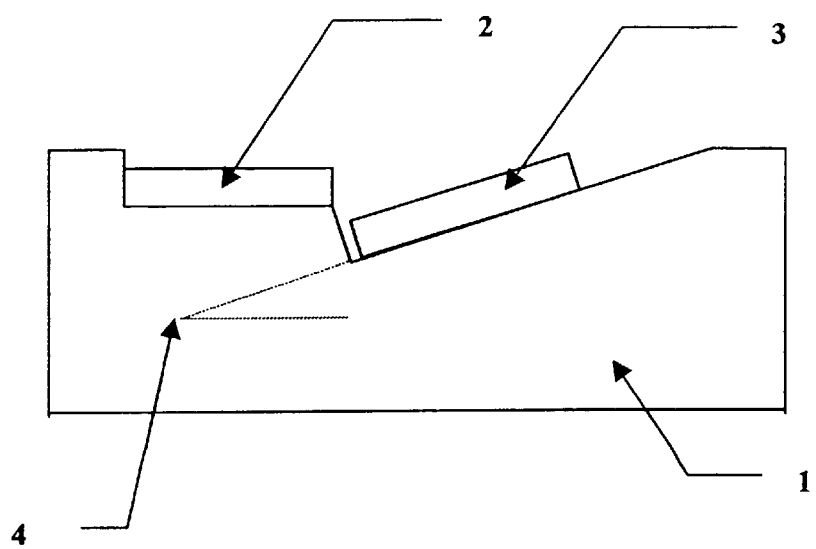
FIG. 17 shows a plane view of a calibration assembly.
Figure 18:
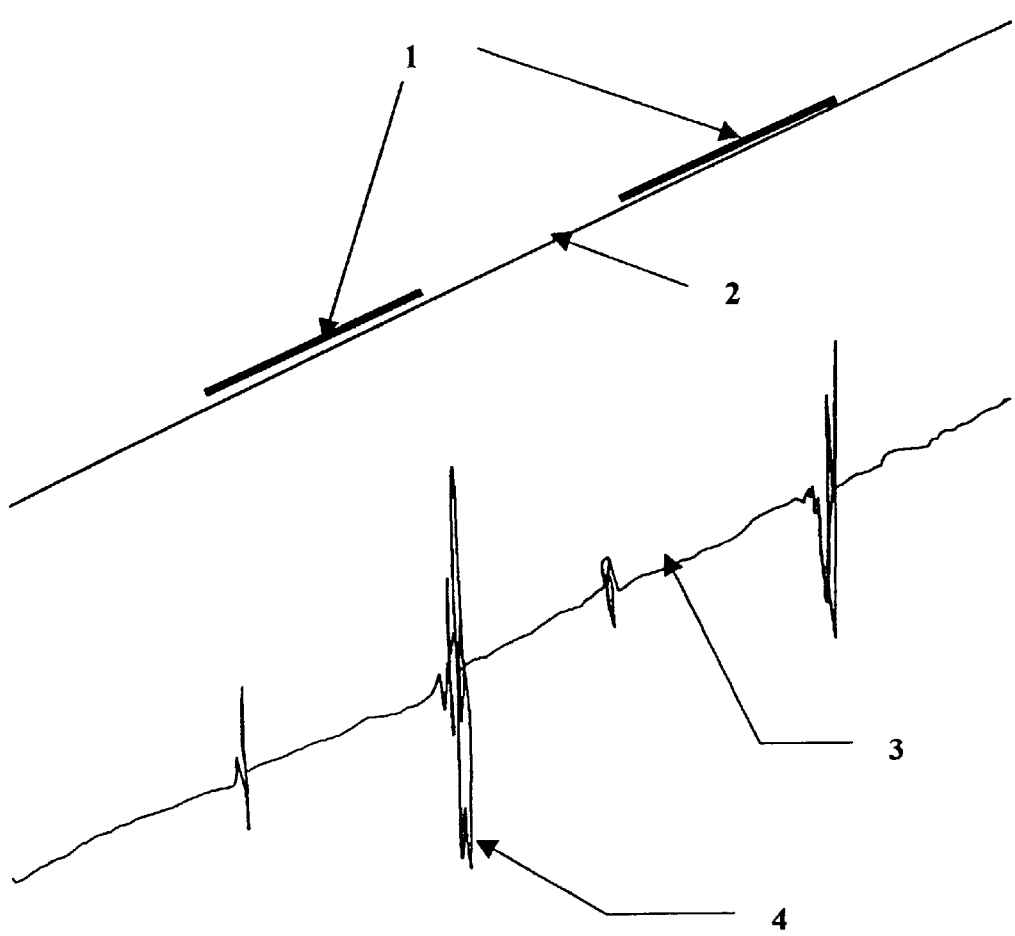
FIG. 18 shows a comparison of the actual profile of an inclined target and the position of the surface as reported by the CLSM. The large magnitude errors are due to edge effects.
Figure 19A:
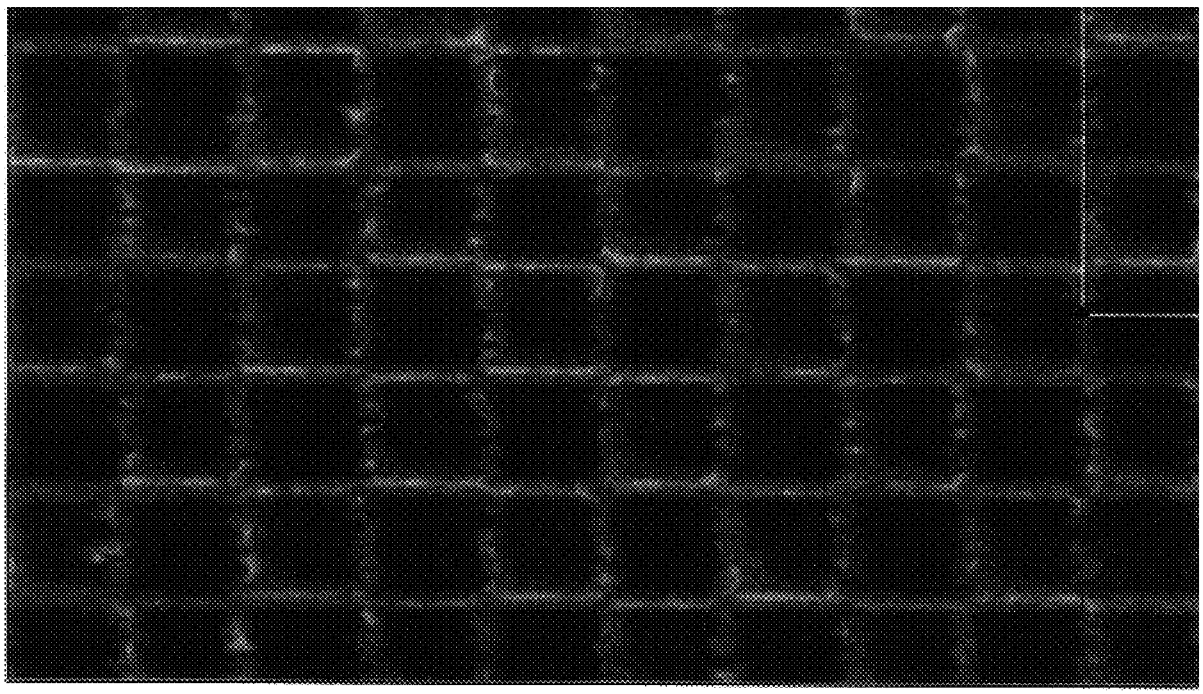
FIGS. 19A and 19B show details on processing the scanned data to generate the calibration data (LUT or function)
Figure 19B:

FIG. 16 illustrates the preferred target (1) chosen to demonstrate this invention. An enlarged detail of the target pattern is also shown in FIG. 16. It consists of a checkerboard pattern of five-micron by five-micron black chrome squares (2) on a glass substrate (3). Photolithography was used to produce the pattern with an accuracy of the greater of +/–1% or +/–0.15 microns over the entire target area. If greater precision were required a higher precision (shorter wavelength light) photolithography process could be used or fiducials could be inserted into the image pattern and the pattern could be mapped to correct for the errors FIG. 17 illustrates the profile view of the assembled device consisting of a mounting fixture (1), a horizontal target (2), and an inclined target (3) at an angle (4) to the horizontal target. FIG. 18 illustrates the plan view of the preferred form of the assembled device consisting of consisting of a mounting fixture (1), a horizontal target (2), and an inclined target (3). The preferred angle of the inclined target is as steep as possible to reduce the amount of time required to gather the required data yet still yield an acceptable image; however there are two factors that limit the maximum angle for the inclined plane. First, the nature of confocal microscopy limits the angle of the imaged surface due to reduced return signal strength. Second, when the pattern overlays the substrate (the photolithography process will have the pattern about 0.1 microns thick) a retroreflector is formed and reflections of light between the raised pattern and the substrate will distort the image in the area of the edge. These edge effects will become more pronounced as the angle of the target increases. A black chrome image on glass was selected to minimize the edge effects as much as possible. FIG. 19 illustrates the results of an experiment with a pattern of bright chrome on glass where 1 is chrome area the ideal profile of the inclined target and (2) is the glass substrate. The profile as measured by the CLSM shows normal areas (3) and areas where edge transitions yielded poor location information. The bright chrome pattern caused significantly worse edge effects than the black chrome on glass combination. A 20-degree angle for the inclined target was selected as optimal for the demonstration of this invention.

The preferred method of using the preferred embodiment of the device for calibration of the CLSM is as follows:

Calibration of the independent axis is performed by use of the horizontal target. The plane of the target is oriented so that the long axis of the checkerboard pattern is parallel to the vector of travel for that axis. The target is scanned by the 3D optical metrology device (such as a CLSM) on a 0.5 micron by 0.5 micron by 0.25 micron grid (XYZ). The scanned volume was 15 microns by 12000 microns by 200 microns (XYZ). The coordinates of the target surface and the return signal intensity are calculated by and saved on a computer. An image of the target is constructed on the computer with the uncalibrated position and intensity data (FIG. 20, diagram 1). The median intensity for the image is determined and that median value is used to identify the feature edge locations on the image (FIG. 20, diagram 2). Dilation and erosion refine the edge locations so that the edge locations form an unbroken mesh (FIG. 20, diagram 3). The locations of the mesh nodes are determined (FIG. 20, diagram 4) and compared to the known node locations and the differences are used to construct one or more calibration functions or lookup tables.

Calibration of the dependent axis is performed using both the horizontal target and the inclined target. The fixture is aligned so that the horizontal target is perpendicular to the optic axis and the slope of the inclined target is parallel to the independent axis. The horizontal target is scanned by the 3D optical metrology device (such as a CLSM) on a 0.5 micron by 0.5 micron by 0.25 micron grid (XYZ). The scanned volume was 150 microns by 150 microns by 200 microns (XYZ). The coordinates of the target surface and the return signal intensity are calculated by and saved on a computer. An image of the target is constructed on the computer with the uncalibrated position and intensity data. The median intensity for the image is determined and that median value is used to identify the feature edge locations on the image. Dilation and erosion refine the edge locations so that the edge locations form an unbroken mesh. The locations of the mesh nodes are determined and compared to the known node locations and the differences are used to determine the roll, pitch, and yaw angles of the calibration fixture. Without moving the calibration fixture, the inclined target is scanned by the 3D optical metrology device (such as a CLSM) on a 0.5 micron by 0.5 micron by 0.25 micron grid (XYZ). The scanned volume was 1000 microns by 3000 microns by 1000 microns (XYZ). The coordinates of the target surface and the return signal intensity are calculated by and saved on a computer. An image of the target is constructed on the computer with the uncalibrated position and intensity data. The median intensity for the image is determined and that median value is used to identify the feature edge locations on the image. Dilation and erosion refine the edge locations so that the edge locations form an unbroken mesh. The locations of the mesh nodes are determined and compared to the known node locations and the differences are used to construct one or more calibration functions or lookup tables.

This aspect of the present invention may also be described as a calibration device comprising:

a) at least two targets, each target having at least one surface exhibiting areas of optical contrast; and each surface having a general plane of orientation (these 'planes' may be literally flat planes or surfaces of an object which have a definable surface including steps, segments of a sphere, and /or other defined geometric shapes, wherein said targets are oriented such that a general plane of orientation of one target (e.g., the planar surface or spherical segment surface) is inclined at an angle (or translated rotation in the instance of two spherical segments) relative to the general plane of orientation (or angle of rotation with a spherical segment) of a surface of the second target having areas of optical contrast. The calibration device may have the areas of optical contrast form a regular repeating image or another predetermined orientation. In the instance where the targets of the device are segments of a sphere, the surface of one or both of said targets are not literally and uniformly planar, but small areas are effectively planar on the surfaces of the sphere and may be used in the same manner as a planar surface. The optical contrast is provided by any of the many varied means of providing optical density variations, including but not limited to a material overlaying a substrate in the form of a coating or printing, an etched or vapor deposited area, a laminated material, an ablated area, a chemically treated area (e.g., by exposure to oxygenating, sulfirating, halogenating, or other active agents which chemically and physically alters the material), and the like. The differential optical density of the device may also be contributed to by two areas having different reflectivity between one material (e.g., one material has a lower reflectivity) and the substrate. The pattern of the device may have the image as a pattern of rectangles, pattern of triangle, circles, or other regular geometric shape. The device may have the surface areas comprising different compounds of the same base material, such as a chromium substrate with a coating of chromium sulfide (which is also referred to as black chromium).

A method of calibrating a three dimensional image may be practiced wherein an optical, 3D imaging device provides image data from at least two target surfaces, the at least two target surfaces being at a predetermined angle with respect to each other, each target surface exhibiting areas of optical contrast in the form of at least three location markers on each surface, measuring a difference between marker locations measured on images of the at least two surfaces and determining the actual location of said marker, using said difference and measurements of other differences between marker locations to generate a lookup table or lookup function, and using that lookup table or lookup function to correct distortions in subsequent images generated by the imaging device.

FIG. 6 illustrates the optical path of a typical confocal microscope consisting of 1 a light source, which produces a light beam and may include a focusing lens 2. This light source is typically a laser, emitting visible or infrared radiation, where the emitted light reflects off of a beamsplitter 3 where it illuminates an objective lens 4. The objective lens 4 focuses the incident light to a focal point which is then scanned through the sample 5 by either moving the sample or the objective lens, or scanning the source light across the objective lens. Light reflected or emitted from the sample 5 is collected by the lens 4 then passes in part through the beamsplitter 3. This returned light is then focused by a spatial filter lens 6 onto the spatial filter 7 which can typically be a pinhole or slit. A significant amount of light passes through the spatial filter 7 only when the sample surface 5 and focal point of the objective lens 3 are coincident. The light passing through the spatial filter 7 is received by a photodetector 8 whose output is read by a computing device 9 which is then used to generate description of the sample 5.

Figure 10:
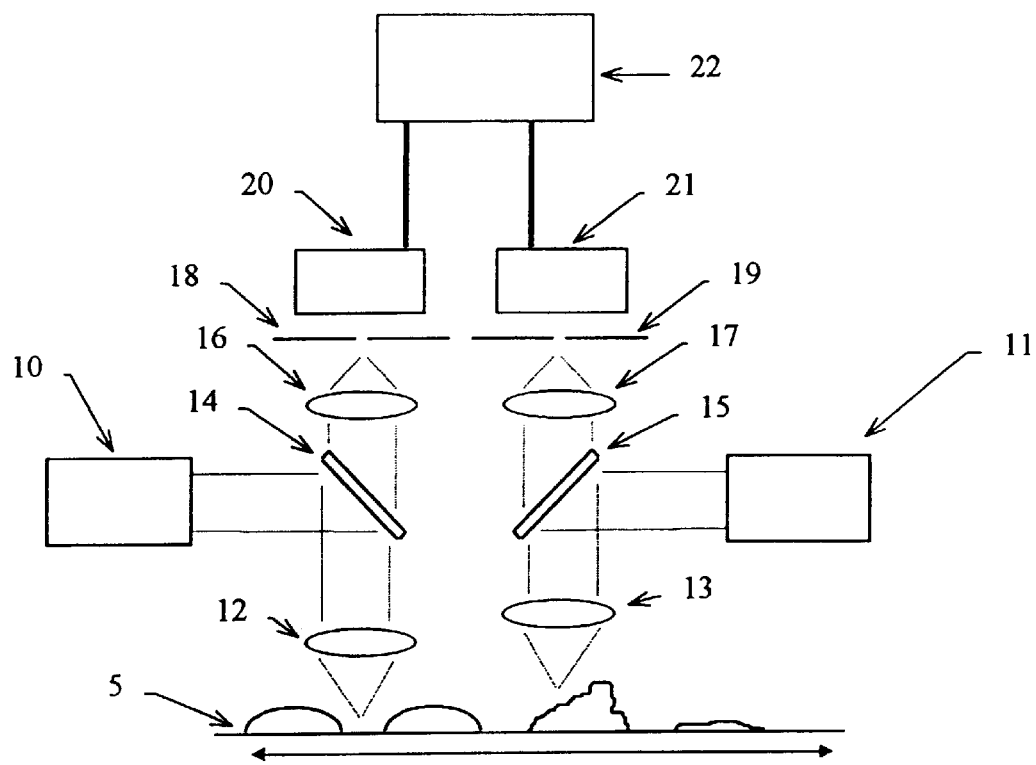
FIG. 10 illustrates of two confocal microscopes with focal points in offset vertically with respect to a sample which is moved through these focal points

The optical configuration of a preferred embodiment is shown in FIG. 10 which contains two confocal microscope optical assemblies. These assemblies contain light sources 10 and 11 which can be separate light sources or the same light source split between the two microscope assemblies. The light from the light sources 10 and 11 can be collected and collimated by lenses although these lenses are not necessary for operation of the microscope. The light is then directed to the objectives lenses 12 and 13 by the beamsplitters 14 and 15 where these beamsplitters could be but are not limited to cube type beamsplitters, plate beamsplitters, or fiber optic beamsplitters. The objective lenses 12 and 13 are offset vertically with respect to each other by a variable amount which is selected according to the sample 5 to be scanned. The objective lenses 12 and 13 focus this light to a focal point. Light reflected or emitted from the sample proximate to these focal points is collected by the objective lenses 12 and 13 and is partially passed through the beam splitters 14 and 15 to the spatial filter lenses 16 and 17. This returned light is then focused by the spatial filter lenses 16 and 17 onto the spatial filters 18 and 19 which can typically be pinholes or slit apertures. A significant amount of light passes through the spatial filters 18 and 19 only when the sample surface 5 and focal point of an objective lens 12 or 13 are coincident. The light passing through the spatial filters 18 and 19 is received by photodetectors 20 and 21 whose outputs are read by a computing device 22 which is then used to determine if features on the sample 5 are within the preselected height range. The height range tested is determined by the separation of the objective lenses 12 and 13. In this case, the sample 5 is scanned by a scanning mechanism through the focal points of both microscopes by moving the sample. This could alternatively be accomplished by moving one or both of the microscopes or by moving both the microscope and the sample by a scanning mechanism. The scanning mechanism could be, but is not limited to, a voice coil, stepper motor, dc servo system, or piezo drive. A significant amount of light reaches the detectors 20 and 21 only when the respective focal points intersect the sample surface. As the sample 5 is scanned through the focal points, the detectors will see a peak in there response as the sample surface passes through the respective focal point. Conversely, if the sample surface does not intersect a focal point, no peak in signal response will be observed from the associated detector. This system has the benefit of having less data to collect than a standard confocal volume image and thus has a higher data rate. This type of system would be useful for inspection of surfaces such as semiconductor packaging including ball grid arrays and flip chip pads where the height of each solder ball must lie within a specified range and the surfaces must be measured very quickly.

Figure 11:
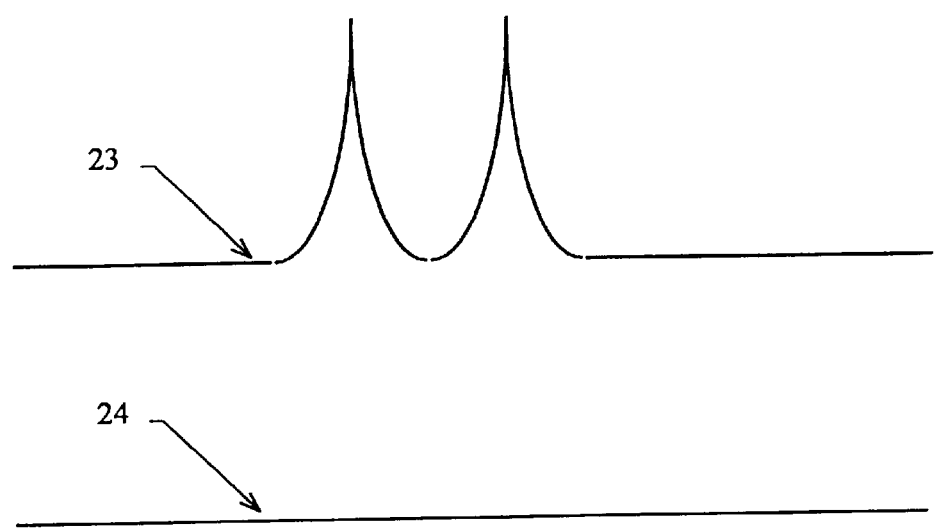
FIG. 11 depicts signals returned from the photodetectors of the two microscopes of FIG. 10 when scanned across a sample which is within the desired limits.

FIG. 11 shows the output response for detectors 20 and 21 as a sample is scanned through their associated focal points and the sample contains a bump whose height lies in the range between the two focal points. The output from the detector 20 associated with the lower focal point is shown as trace 23 and the output of detector 21 associated with the higher focal point is shown as trace 24. Because the sample has a bump height that is above the plane of the lower focal point, its associated detector's 20 output trace 23 will show a peak corresponding to the focal point intersecting the bump surface as the bump is scanned towards the focal point and second peak as the bump is moved away from the focal point. The trace from detector 21 associated with the higher focal point will show no peaks because the bump height is lower than the higher focal point and therefore the bump surface never intersects the higher focal point.

Figure 12:
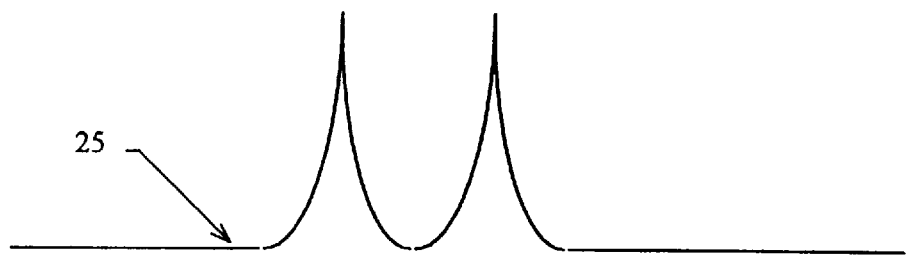
FIG. 12 depicts signals returned from the photodetectors of the two microscopes of FIG. 10 when scanned across a sample which is higher than the desired limits.
Figure 12:
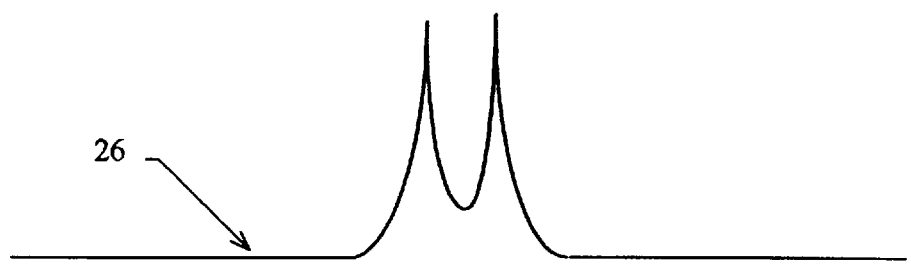

FIG. 12 shows the output detector response associated with a bump whose height is at or above the height of the upper focal point. Trace 25 plots the detector response for the detector associated with the lower focal point. Because the bump is higher than the lower focal point, two peaks will again be observed. Trace 26 plots the detector response for the detector associated with the upper focal point. In this case the bump height is above the upper focal point, so this focal point will encounter the bump surface and peaks in the detector output will be observed.

Figure 13:
FIG. 13 depicts signals returned from the photodetectors of the two microscopes of FIG. 10 when scanned across a sample which is lower than the desired limits.
Figure 13:

FIG. 13 shows the detector output response associated with a bump whose height is below the lower focal point. Because the bump is below the lower focal point, it will not encounter either the lower or upper focal points so the detector output from both detectors will be flat as shown by traces 27 and 28.

By using the fact that the detector trace associated with the lower focal point will have two peaks and the trace associated with the upper focal point will have none only if the height of a sample feature is located between the two focal points, it is possible to perform a pass/fail test on the sample feature. It is also possible to vary the pass/fail limits by adjusting the relative position of the two focal points (i.e. the relative position of the two objective lenses 12 and 13) and their position relative to the sample position.

Figure 14:
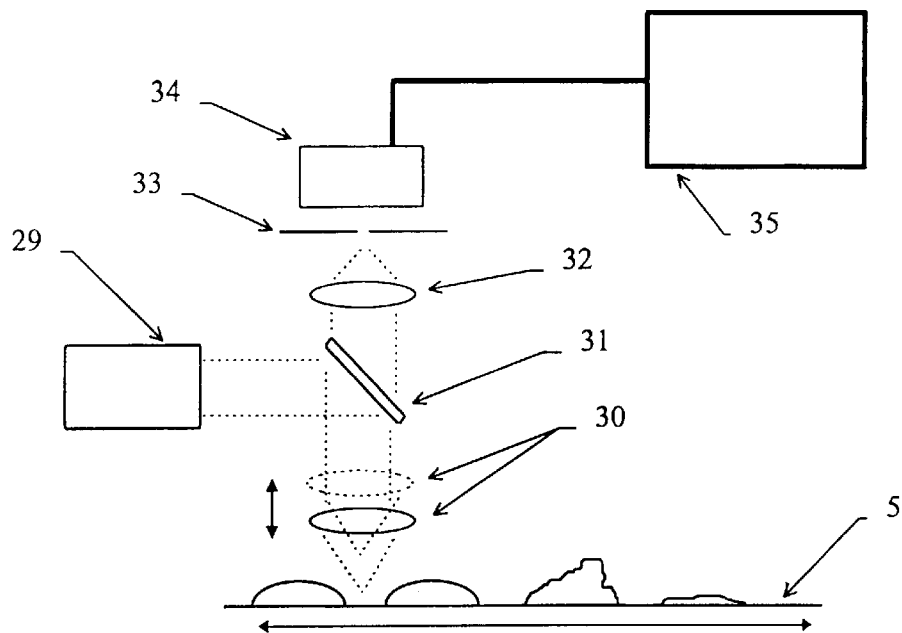
FIG. 14 illustrates a confocal microscope which is capable of moving its focal point vertically with respect to a sample which is moved through this focal point.
Figure 15:
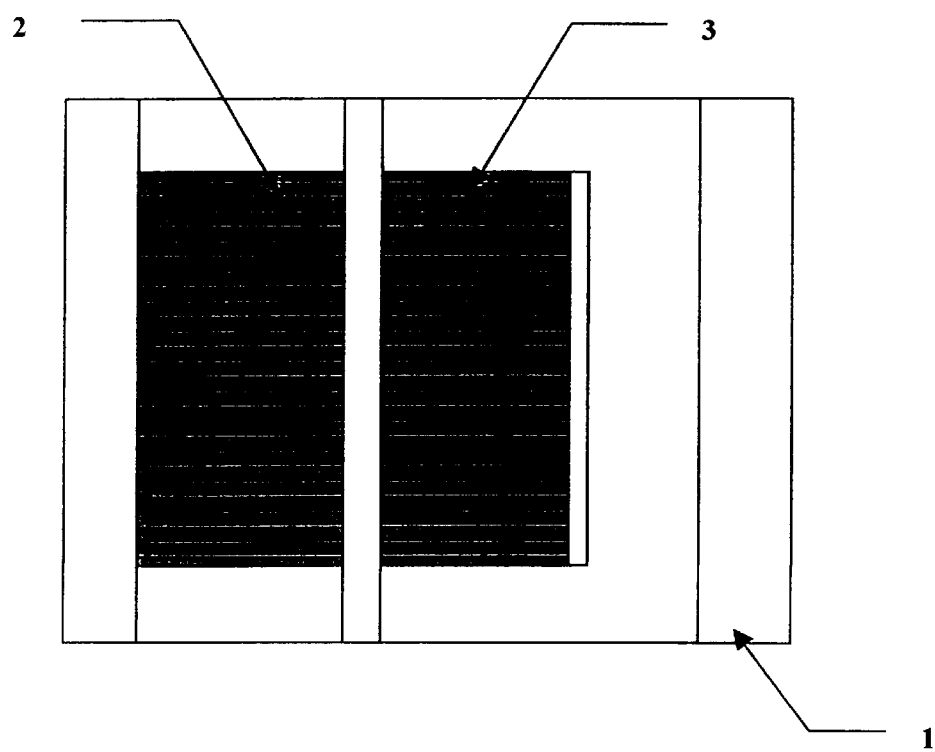
FIG. 15 shows the details of a preferred target pattern.

The optical configuration of a second preferred embodiment is shown in FIG. 14. This assembly consists of a light source 29 which can be collimated by a lens, although this lens is not necessary for operation of the microscope. The light is then directed to the objectives lens 30 by the beam splitter 31 where this beamsplitter could be but are not limited to a cube type beamsplitter, plate beamsplitter, or fiber optic beamsplitter. The objective lens 30 can be offset vertically with respect to the sample 5 by a variable amount by an actuator mechanism which could be but is not limited to a voice coil motor, piezo actuator, or stepper motor. The objective lens 30 focuses this light to focal point. Light reflected or emitted from the sample proximate to the focal point is collected by the objective lens 30 and is partially passed through the beam splitter 31 to the spatial filter lens 32. This returned light is then focused by a spatial filter lens 32 onto the spatial filter 33 which can typically be either a pinhole or slit aperture. A significant amount of light passes through the spatial filter 33 only when the sample surface 5 and focal point of the objective lens 30 are coincident. The light passing through the spatial filter 33 is received by a photodetector 34 whose output is read by a computing device 35. The sample 5 can then be scanned at least two times with the objective lens in different positions to produce the same pass/fail determination as described in the embodiment with two microscope assemblies.

A further embodiment could include an image acquisition device which acquires a two dimensional image of the sample surface that is sent to a computing device or signal processor which in turn produces a map of the features to be scanned on the sample. This map is then used by the computing device to direct the scanning means so that the focal point(s) pass over the features of interest. A further embodiment has a predetermined sample map which is stored by the computing device or signal processor and used to by the computing device or signal processor to direct the scanning means so that the focal point(s) pass over the features of interest.

We claim:

1. A calibration device comprising:
   a) at least two targets, each target having at least one surface exhibiting areas of optical contrast; and each surface having a general plane of orientation, wherein said targets are oriented such that a general plane of orientation of one target is inclined at a predetermined angle relative to the general plane of orientation of a surface of the second target having areas of optical contrast.

2. The calibration device of claim 1 wherein said areas of optical contrast form a regular repeating image.

3. The device of claim 1 wherein said optical contrast is provided by a material overlaying a substrate.

4. The device of claim 2 wherein said optical contrast is provided by a material overlaying a substrate.

5. The device of claim 3 wherein said material has a lower reflectivity than said substrate.

6. The device of claim 4 wherein said material has a lower reflectivity that said substrate.

7. The device of claim 2 wherein said image is a pattern of rectangles.

8. The device of claim 4 wherein said image is a pattern of rectangles.

9. The device of claim 3 wherein said material comprises chromium sulfide.

10. A method of calibrating a three dimensional image wherein; an optical, 3D imaging device provides image data from at least two target surfaces, said at least two target surfaces being at a predetermined angle with respect to each other, each target surface exhibiting areas of optical contrast in the form of at least three location markers on each surface, measuring a difference between marker locations measured on images of said at least two surfaces and determining the actual location of said marker, using said difference and measurements of other differences between marker locations to generate a lookup table or lookup function, and using that lookup table or lookup function to correct distortions in subsequent images generated by the imaging device.

11. The method of claim 10 wherein said areas of optical contrast form a pattern of squares in a checkerboard formation.

12. The method of claim 10 wherein said pattern consists of staggered squares of chromium sulfide overlaying a substrate and the pattern is formed from contrast between the squares and the substrate.

13. The calibration device of claim 1 further comprising and optical system in combination with the at least two targets, the optical system comprising:
   a) an illumination source providing a light beam;
   b) an optical fiber which transmits said light beam to an objective lens through a fiber optic beam splitter, where said objective lens oscillates in at least two dimensions, the objective lens providing a focal point which scans a volume of space into which a sample may be placed and from which sample light is collected by said objective lens, and said fiber optic beam splitter diverts at least some light reflected or emitted from said sample and collected by said objective lens;
   c) a means for detecting said reflected or emitted light and producing an output signal; and
   d) a signal processor for receiving said output signal.

14. The calibration device of claim 13 where said optical fibers and said fiber optic beam splitter support transmission of only a single optical mode, support transmission of multiple optical modes, or maintain the polarization state of the illumination source.

15. The calibration system of claim 13 where a lens is positioned between said optical fiber and said objective lens.

16. The calibration device of claim 1 further comprising and optical system in combination with the at least two targets, the optical system comprising:
   a) an illumination source which provides a light beam;

b) an optical fiber which transmits said light beam to an objective lens, and where said objective lens oscillates in at least two dimensions, the objective lens providing a focal point which scans a volume of space into which a sample may be placed and collects light from said sample, c) a beam splitter which diverts a portion of light reflected or emitted from said sample and collected by said objective lens;

d) a second optical fiber which collects said reflected or emitted light and transports it to a means for detecting said reflected or emitted light and producing an output signal; and e) a signal processor for receiving said output signal.

17. The calibration device of claim 16 where said optical fibers and said fiber optic beam splitter support transmission of only a single optical mode, support transmission of multiple optical modes, or maintain the polarization state of the illumination source.

18. The calibration device of claim 13 comprising an illumination source providing a light beam along a preferred optical axis;

a low mass objective lens scanned in an oscillating manner in at least one direction by a mechanical drive;

the objective lens focusing the beam to a focal point into a volume of space into which a sample may be placed;

the optical aperture of said objective lens being at least partially filled by said light beam during at least a portion of said scan;

a beam splitter that diverts at least a portion of light reflected or emitted from said sample along said optical axis;

a means for detecting said emitted or reflected light originating proximate to said focal point and diverted by said beam splitter; and a computer for a) recording the signal from said detector means to form a recorded signal and b) for estimating the position of said objective lens, wherein the position of said objective lens is determined by a light source from said objective lens selected from the group consisting of a) and b) wherein a) and b) are:

a) a secondary direct light source attached to the objective lens and a position sensing photodiode which can receive light from said secondary direct light source, such that movement of said objective lens in one or two axes causes a corresponding change in the location of received light from said secondary direct light source, illuminating said position sensing photodiode, and b) light reflective element on said objective lens which light reflective element reflects light towards a position sensing photodiode which can receive reflected light such that movement of said objective lens in one or two axes causes a corresponding change in the location of received light from said light reflective element, illuminating said position sensing photodiode.

19. The microscope of claim 18, wherein at least one axis of motion of said scanner is provided by an electromagnetic coil which is provided with a drive current and interacts with a stationary magnetic field.

20. The calibration device of claim 18 wherein a reflective light element is present which light reflective element comprises a mirror attached to said objective lens.

21. The calibration device of claim 1 wherein said planes are inclined with respect to each other at about 20 degrees.

* * * * *